(12) United States Patent
Yamashita et al.

(10) Patent No.: US 10,326,140 B2
(45) Date of Patent: *Jun. 18, 2019

(54) NONAQUEOUS ELECTROLYTE BATTERY, BATTERY PACK, AND VEHICLE

(71) Applicant: KABUSHIKI KAISHA TOSHIBA, Minato-ku (JP)

(72) Inventors: Yasunobu Yamashita, Tokyo (JP); Yoshiyuki Isozaki, Tokyo (JP); Mitsuru Ishibashi, Yokohama (JP); Kazuki Ise, Kawasaki (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 136 days.

This patent is subject to a terminal disclaimer.

(21) Appl. No.: 15/445,726

(22) Filed: Feb. 28, 2017

(65) Prior Publication Data

US 2018/0083283 A1    Mar. 22, 2018

(30) Foreign Application Priority Data

Sep. 21, 2016    (JP) ................. 2016-183631

(51) Int. Cl.
*H01M 4/62*    (2006.01)
*H01M 10/44*    (2006.01)
(Continued)

(52) U.S. Cl.
CPC ......... *H01M 4/622* (2013.01); *H01M 2/1077* (2013.01); *H01M 4/0404* (2013.01);
(Continued)

(58) Field of Classification Search
None
See application file for complete search history.

(56) References Cited

U.S. PATENT DOCUMENTS

2013/0122364 A1    5/2013    Kim et al.
2013/0252077 A1    9/2013    Iwasaki et al.
(Continued)

FOREIGN PATENT DOCUMENTS

EP    2 874 212 A1    5/2015
JP    2013-201097    10/2013
(Continued)

OTHER PUBLICATIONS

Extended European Search Report dated Apr. 11, 2017 in Patent Application No. 17157839.6.
(Continued)

*Primary Examiner* — Sarah A. Slifka
(74) *Attorney, Agent, or Firm* — Oblon, McClelland, Maier & Neustadt, L.L.P.

(57) ABSTRACT

According to one embodiment, a nonaqueous electrolyte battery including a negative electrode that includes a negative electrode current collector and a negative electrode mixed-materials layer is provided. The negative electrode mixed-materials layer includes a titanium-including metal oxide particle that includes a phase including a carbon material on a surface and a binder that includes an acrylic resin. The negative electrode satisfies Equation (I):

$$\alpha/\beta > 6 \qquad (I)$$

α is a peel strength (kN/m) between the negative electrode current collector and the negative electrode mixed-materials layer, and β is a cutting strength (kN/m) in the negative electrode mixed-materials layer.

19 Claims, 6 Drawing Sheets

(51) Int. Cl.
  *H01M 2/10* (2006.01)
  *H01M 10/42* (2006.01)
  *H01M 4/485* (2010.01)
  *H01M 4/36* (2006.01)
  *H01M 4/04* (2006.01)
  *H01M 4/131* (2010.01)
  *H01M 10/0525* (2010.01)

(52) U.S. Cl.
  CPC .......... *H01M 4/131* (2013.01); *H01M 4/366* (2013.01); *H01M 4/485* (2013.01); *H01M 4/625* (2013.01); *H01M 10/0525* (2013.01); *H01M 10/425* (2013.01); *H01M 10/44* (2013.01); *H01M 2220/20* (2013.01); *Y02E 60/122* (2013.01); *Y02T 10/7011* (2013.01)

(56) References Cited

U.S. PATENT DOCUMENTS

| | | |
|---|---|---|
| 2013/0323537 A1 | 12/2013 | Iwasaki et al. |
| 2014/0004400 A1 | 1/2014 | Ueki et al. |
| 2014/0287308 A1 | 9/2014 | Okada et al. |
| 2014/0295248 A1 | 10/2014 | Hotta et al. |
| 2014/0295249 A1 | 10/2014 | Hotta et al. |
| 2015/0044559 A1 | 2/2015 | Toyoda |
| 2015/0086852 A1 | 3/2015 | Matsuno et al. |
| 2015/0086872 A1 | 3/2015 | Ise et al. |
| 2015/0294802 A1 | 10/2015 | Kato et al. |
| 2015/0372307 A1 | 12/2015 | Shigematsu et al. |
| 2016/0149190 A1 | 5/2016 | Fukuchi |

FOREIGN PATENT DOCUMENTS

| | | |
|---|---|---|
| JP | 2013-206598 | 10/2013 |
| JP | 2013-251073 | 12/2013 |
| JP | 2014-13720 | 1/2014 |
| JP | 2015-84321 | 4/2015 |
| JP | 2015-179565 | 10/2015 |
| KR | 10-2013-0131475 A | 12/2013 |
| KR | 10-2014-0018255 A | 2/2014 |
| KR | 10-2015-0032781 A | 3/2015 |
| WO | WO 00/49103 A1 | 8/2000 |
| WO | 2009/128589 A1 | 10/2009 |
| WO | WO 2013/081152 | 6/2013 |
| WO | WO 2013/176232 A1 | 11/2013 |
| WO | WO 2013/191239 A1 | 12/2013 |
| WO | WO 2014/024937 A1 | 2/2014 |
| WO | WO 2014/024967 A1 | 2/2014 |
| WO | WO 2014/119554 A1 | 8/2014 |
| WO | WO 2017/046896 A1 | 3/2017 |

OTHER PUBLICATIONS

Bongki Son et al; "Measurement and Analysis of Adhesion Property of Lithium-Ion Battery Electrodes with SAICAS", ACS Applied Materials and Interfaces, vol. 6, No. 1, XP055359994,Jan. 8, 2014, pp. 526-531 and Cover page.

Chieko Narita et al: "Study on the Appearance and Peel Strength of Byakudan-Nuri Works", Materials Sciences and Application, vol. 05, No. 02, XP055359990, Jan. 1, 2014, pp. 81-85.

M. Ghoranneviss et al: "Review of Carbon Nanotubes Production by Thermal Chemical Vapor Deposition Technique", Molecular Crystals and Liquid Crystals, vol. 629, No. 1, XP055360348, Apr. 12, 2016, pp. 158-164 and Cover page.

Dongxing Yang et al: "Chemical Analysis of Graphene Oxide Films After Heat and Chemical Treatments by X-Ray Photoelectron and Micro-Raman Spectroscopy", Carbon, Elsevier, Oxford, GB, vol. 47, No. 1, XP025715603, Jan. 1, 2009, pp. 145-152.

Kyuman Kim et al., "Three-Dimensional Adhesion Map Based on Surface and Interfacial Cutting Analysis System for Predicting Adhesion Properties of Composite Electrodes", ACS Applied Materials & Interfaces, vol. 8, No. 36, XP055359622, Sep. 14, 2016, pp. 23688-23695.

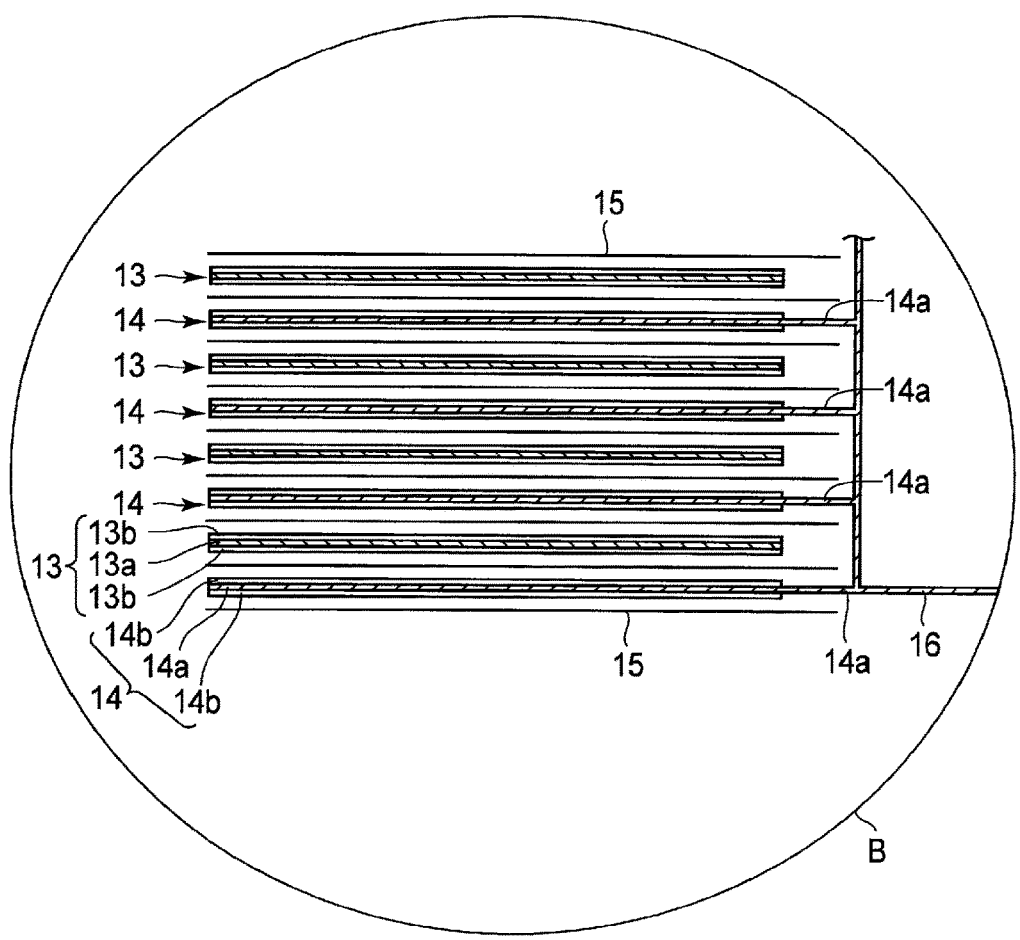
F I G. 4

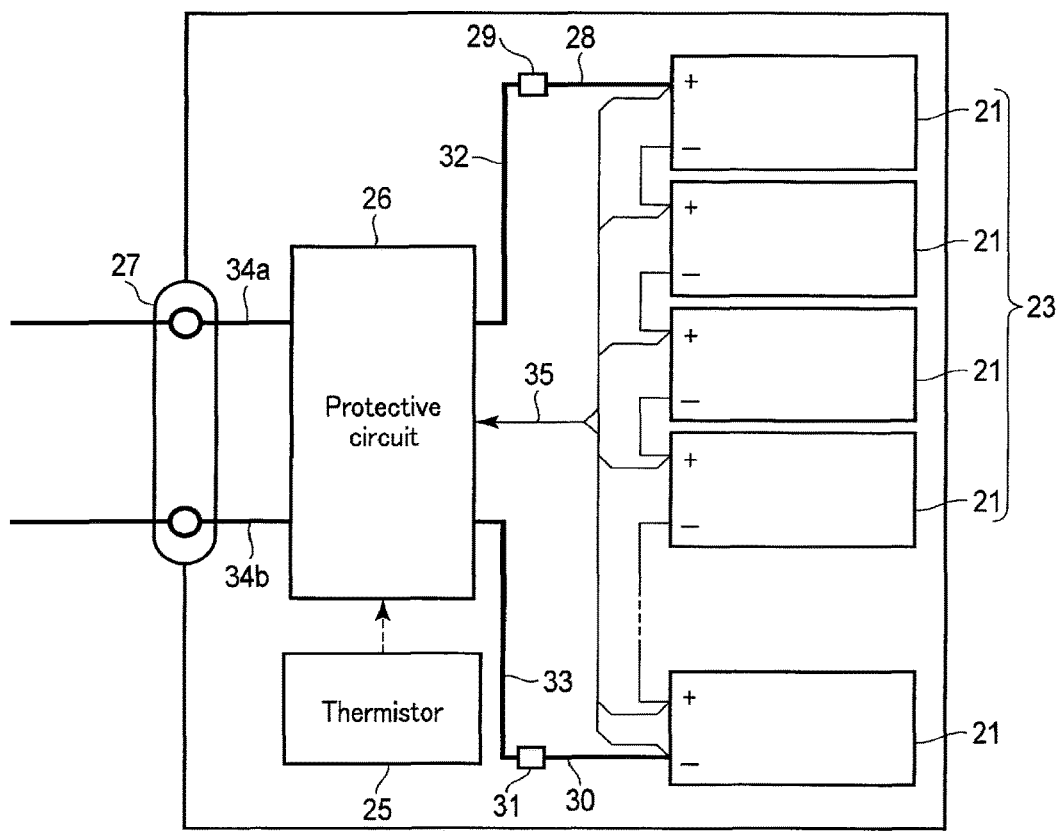
F I G. 6

NONAQUEOUS ELECTROLYTE BATTERY, BATTERY PACK, AND VEHICLE

CROSS-REFERENCE TO RELATED APPLICATION

This application is based upon and claims the benefit of priority from Japanese Patent Application No. 2016-183631, filed Sep. 21, 2016; the entire contents of which is incorporated herein by reference.

FIELD

Embodiments relate to a nonaqueous electrolyte battery, a battery pack, and a vehicle.

BACKGROUND

Presently, research and development of a nonaqueous electrolyte secondary battery in which charging and discharging are performed by moving Li ions between a negative electrode and a positive electrode, as a high energy density battery, have been actively conducted. Until now, a lithium ion secondary battery which includes a positive electrode including $LiCoO_2$ or $LiMn_2O_4$ as an active material and a negative electrode including a carbonaceous material that inserts and extracts lithium has been widely commercialized for mobile devices.

The lithium ion secondary battery has been recently and widely used as power sources for environmental-friendly automobiles such as electric vehicles (EV), hybrid electric vehicles (HEV), plug-in hybrid electric vehicles (PHEV), and vehicles equipped with an idling-stop system (ISS), which are developed in view of environmental issues. When the lithium ion secondary battery is mounted on a vehicle such as an electric vehicle or a hybrid electric vehicle, the lithium ion secondary battery is required to have storage performance under high temperature environment, cycle performance, high power with long-term reliability and the like.

In addition, when the lithium ion secondary battery is installed in an engine compartment of an automobile to be used as a substitute for a lead storage battery, it is required for the lithium ion secondary battery to have high temperature durability (for example, at 60° C. or more, and preferably, 80° C. or more). Further, when high performance in cold regions is required, high power performance or long life performance at low temperature environment (for example, −30° C.) is needed.

Accordingly, constituent materials of batteries such as a positive electrode, a negative electrode, a separator, and a nonaqueous electrolyte are required to be composed of materials having excellent chemical and electrochemical stability, strength, and corrosion resistance at high temperature and low temperature.

However, a negative electrode used in a nonaqueous electrolyte battery such as a lithium ion secondary battery has generally a structure in which a negative electrode active material layer is formed on a current collector. In addition to a negative electrode active material, a binder for binding the negative electrode active materials to each other and for binding the negative electrode active material and the current collector is used in the negative electrode active material layer.

As the binder, a fluorine-based resin (for example, polyvinylidene fluoride (PVdF)) or a modified substance thereof is generally used. However, the fluorine-based resin or the modified substance thereof easily swells with respect to the nonaqueous electrolyte at a high temperature. Accordingly, there is concern that high temperature cycle performance may be deteriorated in a battery having a negative electrode including the fluorine-based resin or the modified substance thereof as the binder. Specifically, in the battery using such a fluorine-based resin as the binder for the negative electrode, network of an electron conduction of the negative electrode is disconnected as charge-and-discharge cycles proceed at a high temperature, and as a result, internal resistance of the negative electrode is increased.

Therefore, a synthetic rubbery polymer such as an acrylic resin, instead of the fluorine-based resin such as PVdF, is proposed as the binder for the negative electrode.

BRIEF DESCRIPTION OF THE DRAWINGS

FIG. 4 is an enlarged cross-sectional view showing a portion B in FIG. 3;

FIG. 6 is a block diagram showing an electric circuit of the battery pack of FIG. 5;

DETAILED DESCRIPTION

Figure 1:
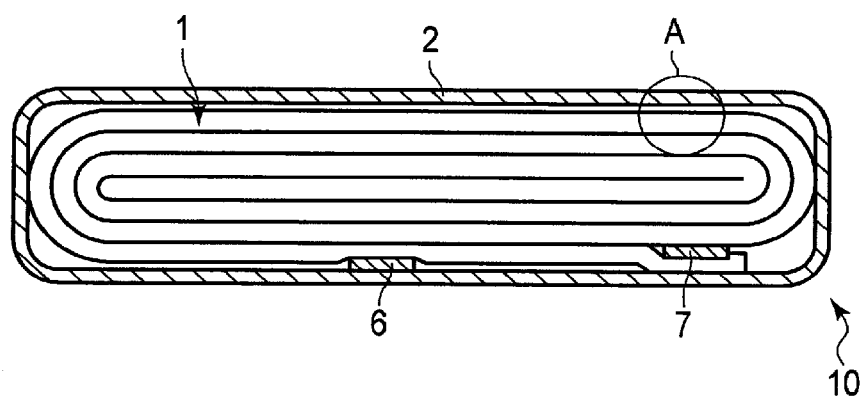
FIG. 1 is a cross-sectional view of an example of a nonaqueous electrolyte battery according to a first embodiment.

According to an embodiment, a nonaqueous electrolyte battery is provided. The nonaqueous electrolyte battery includes a positive electrode, a negative electrode, and a nonaqueous electrolyte. The negative electrode includes a negative electrode current collector and a negative electrode mixed-materials layer disposed on the negative electrode current collector. The negative electrode mixed-materials layer includes a titanium-including metal oxide particle capable of having lithium ions inserted into and extracted from, and a binder that includes an acrylic resin. The titanium-including metal oxide particle includes a phase including a carbon material on at least a portion of a surface thereof. This negative electrode satisfies Equation (I) below:

$$\alpha/\beta > 6 \qquad (I)$$

in Equation (I), α is a peel strength (kN/m) between the negative electrode current collector and the negative electrode mixed-materials layer according to a surface/interface cutting method, and β is a cutting strength (kN/m) in the negative electrode mixed-materials layer according to the surface/interface cutting method.

According to another embodiment, a battery pack is provided. This battery pack includes the nonaqueous electrolyte battery of the above-described embodiment.

According to still another embodiment, a vehicle is provided. This vehicle includes the battery pack of the above-described embodiment.

Titanium-including metal oxide particles are apt to be firmly adhered to an acrylic binder due to, for example, an effect of interaction between a surface functional group present on a surface of oxide particles and a functional group of an acrylic resin. This causes defects such as an electrode having poor flexibility or a mixed-materials layer being easily peeled from the current collector, since excessive binding property between the active materials is exhibited when the titanium-including metal oxide particles as the active material and the acrylic resin as the binder are used together.

In the nonaqueous electrolyte battery according to the embodiment, the negative electrode mixed-materials layer includes the titanium-including metal oxide particles having a carbon-including phase on at least a portion of a surface thereof; and the binder including the acrylic resin. According to this configuration, the interaction between the surface functional group present on the surface of titanium metal oxide as the active material and the functional group of the acrylic resin can be alleviated in the negative electrode mixed-materials layer, and thus, excessive binding property between the active materials is not exhibited. Further, a ratio ($\alpha/\beta$) of the peel strength $\alpha$ between the negative electrode current collector and the negative electrode mixed-materials layer, and the cutting strength $\beta$ in the negative electrode mixed-materials layer is larger than 6 in the nonaqueous electrolyte battery according to the embodiment. When the ratio ($\alpha/\beta$) of the peel strength to the cutting strength is larger than 6, the binding property between the current collector and the mixed-materials layer is able to be sufficiently secured.

Embodiments will be hereinafter described with reference to the accompanying drawings. In the following description of the drawings, the same or similar parts are denoted by the same or similar reference numerals, and duplicated explanations are omitted. However, it should be noted that the drawings are schematic, and relationship between a thickness and a planar dimension, a ratio of thicknesses of respective layers, and the like are different from those of actual cases. Accordingly, specific thickness and dimensions should be judged based on the following description. The drawings also include parts where dimensional relationship or proportions are mutually different from each other.

Further, embodiments described below illustrate an apparatus or a method for embodying technical idea of the invention, and thus, technical idea of the invention does not specify a material, a shape, a structure, or disposition of constituent components as described below. The technical idea of the invention may make various changes within the scope of the claims.

(First embodiment)

According to a first embodiment, a nonaqueous electrolyte battery is provided. The nonaqueous electrolyte battery includes a positive electrode, a negative electrode, and a nonaqueous electrolyte. The negative electrode includes a negative electrode current collector and a negative electrode mixed-materials layer disposed on the negative electrode current collector. The negative electrode mixed-materials layer includes a titanium-including metal oxide particle into which lithium ions are inserted and from which lithium ions are extracted and a binder that includes an acrylic resin. The titanium-including metal oxide particle has a phase including a carbon material on at least a portion of a surface thereof. The peel strength $\alpha$ (unit: kN/m) between the negative electrode current collector and the negative electrode mixed-materials layer, which is measured by the surface/interface cutting method, and the cutting strength $\beta$ (unit: kN/m) in the negative electrode mixed-materials layer which is measured by the surface/interface cutting method satisfy a relationship of $\alpha/\beta > 6$.

The nonaqueous electrolyte battery according to the first embodiment will be more specifically described with reference to the drawings.

First, an example of the nonaqueous electrolyte battery according to the first embodiment will be described with reference to FIGS. 1 and 2.

FIG. 1 is a cross-sectional view of an example of a nonaqueous electrolyte battery according to the first embodiment. FIG. 2 is an enlarged cross-sectional view showing a portion A in FIG. 1.

Figure 2:
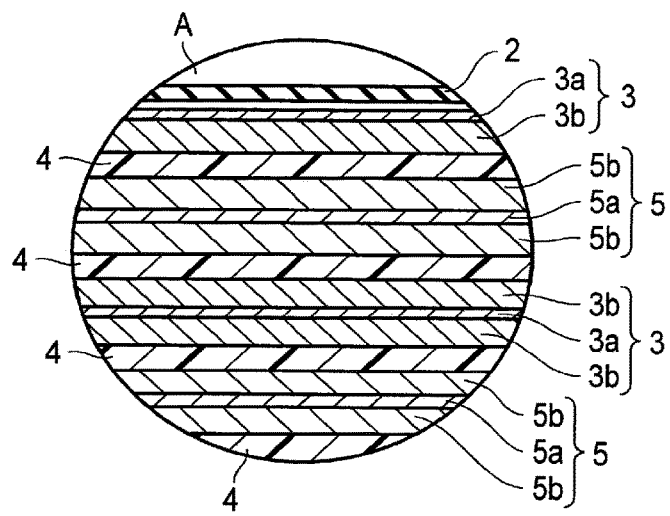
FIG. 2 is an enlarged cross-sectional view showing a portion A in FIG. 1.

A nonaqueous electrolyte battery 10 shown in FIGS. 1 and 2 includes a bag-shaped container member 2 shown in FIG. 1, an electrode group 1 shown in FIGS. 1 and 2, and a nonaqueous electrolyte (not shown). The electrode group 1 and the nonaqueous electrolyte are housed in the container member 2. The nonaqueous electrolyte is held in the electrode group 1.

The bag shaped container member 2 is made of a laminate film including two resin layers and a metal layer sandwiched between the resin layers.

As shown in FIG. 1, the electrode group 1 is a wound electrode group in a flat form. The wound electrode group 1 in a flat form includes a negative electrode 3, a separator 4, and a positive electrode 5, as shown in FIG. 2. The separator 4 is sandwiched in between the negative electrode 3 and the positive electrode 5.

The negative electrode 3 includes a negative electrode current collector 3a and a negative electrode layer 3b. The negative electrode 3 may be the negative electrode active material layer described later. Of the negative electrode 3, in a part located in the outermost shell of the wound electrode group 1, the negative electrode layer 3b is formed on the negative electrode current collector 3a, only on the surface facing the center of the electrode group, as shown in FIG. 2. In the other parts of the negative electrode 3, the negative electrode layer 3b is formed on both of reverse surfaces of the negative electrode current collector 3a.

The positive electrode 5 includes a positive electrode current collector 5a and positive electrode layers 5b formed on both of reverse surfaces of the positive electrode current collector 5a. The positive electrode 5 may be the positive electrode active material layer described later.

As shown in FIG. 1, in the vicinity of the outer peripheral edge of the wound electrode group 1, a negative electrode terminal 6 is connected to the negative electrode current collector 3a positioned in the outermost part of negative electrode 3, and a positive electrode terminal 7 is connected to the positive electrode current collector 5a in the positive electrode 5 on the inner side. The negative electrode terminal 6 and the positive electrode terminal 7 are extended out from the opening of the bag shaped container member 2.

The nonaqueous electrolyte battery 10 shown in FIGS. 1 and 2 can be produced according to the following procedure, for example. First, an electrode group 1 is produced. The wound electrode group 1 in a flat form as described can be formed by, for example, stacking a negative electrode 3, a separator 4, a positive electrode 5, and another separator 4, such that the separators 4 are sandwiched between the negative electrode 3 and the positive electrode 5, to obtain a stack, then spirally winding the stack in a manner so that a part of the negative electrode 3 would be positioned on the outside as shown in FIG. 2, and then press-forming the wound stack. The electrode group 1 is then enclosed in a bag-shaped container member 2. Upon which, one end of each the negative electrode terminal 6 and positive electrode terminal 7 are made to protrude outside the container member 2. Next, the circumference of the container member 2 is heat-sealed with a portion left unsealed. Next, treating a portion that had not been heat-sealed as an opening of the bag shaped container member 2, for example, a liquid nonaqueous electrolyte is poured in via this opening. Finally, the opening is heat-sealed, and thereby the wound electrode group 1 and the liquid nonaqueous electrolyte are completely sealed.

Figure 3:
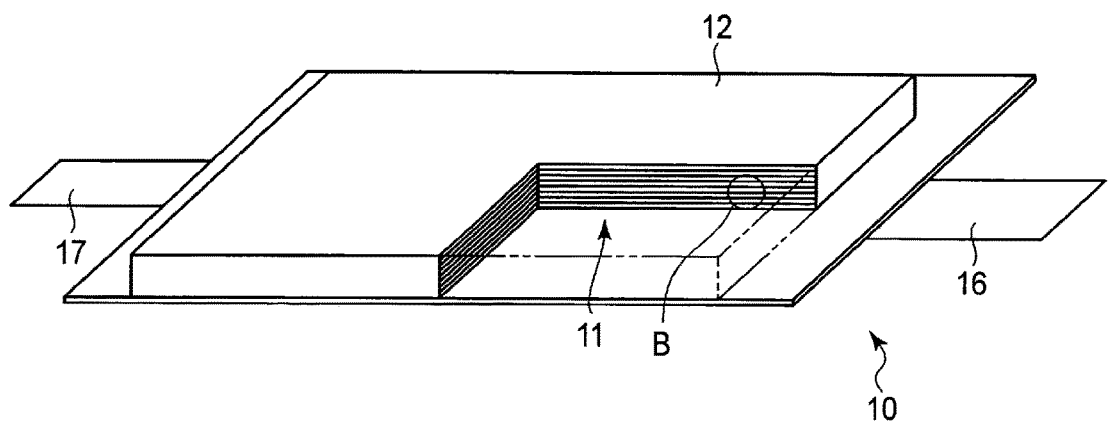
FIG. 3 is a partially cut-out perspective view schematically showing another example of a nonaqueous electrolyte battery according to the first embodiment.

The nonaqueous electrolyte battery according to the first embodiment is not limited to the example nonaqueous electrolyte secondary battery shown above in FIGS. 1 and 2, and may be, for example, a battery configured as shown in FIGS. 3 and 4.

FIG. 3 is a partially cut-out perspective view schematically showing another example of a nonaqueous electrolyte battery according to the first embodiment. FIG. 4 is an enlarged cross-sectional view showing section B in FIG. 3.

A nonaqueous electrolyte battery 10 shown in FIGS. 3 and 4 includes an electrode group 11 shown in FIGS. 3 and 4, a container member 12 shown in FIG. 3, and a nonaqueous electrolyte (not shown). The electrode group 11 and the nonaqueous electrolyte are housed in the container member 12. The nonaqueous electrolyte is held in the electrode group 11.

The container member 12 is made of a laminate film including two resin layers and a metal layer sandwiched between the resin layers.

As shown in FIG. 4, the electrode group 11 is a stacked electrode group. As shown in FIG. 4, the stacked electrode group 11 has a structure in which positive electrodes 13 and negative electrodes 14 are alternately stacked with a separator 15 sandwiched therebetween.

The electrode group 11 includes plural positive electrodes 13. Each of the plural positive electrodes 13 includes a positive electrode current collector 13a, and positive electrode layers 13b supported on both of reverse surfaces of the positive electrode current collector 13a. The electrode group 11 includes plural negative electrodes 14. Each of the plural negative electrodes 14 includes a negative electrode current collector 14a, and negative electrode layers 14b supported on both of reverse surfaces of the negative electrode current collector 14a. An end of the negative electrode current collector 14a of each of the negative electrodes 14 protrudes out from the negative electrode 14. The protruded negative electrode current collector 14a is electrically connected to a strip-shaped negative electrode terminal 16. The tip of the strip-shaped negative electrode terminal 16 is extended out from the container member 12. Although not shown in the drawings, an end of the positive electrode current collector 13a of the positive electrodes 13 protrude from the positive electrodes 13 at the side opposed to the protruded end of the negative electrode current collector 14a. The positive electrode current collector 13a protruding from the positive electrode 13 is electrically connected to a strip-shaped positive electrode terminal 17. The tip of the strip-shaped positive electrode terminal 17 is positioned on the opposite side from the negative electrode terminal 16, and extended out from a side of the container member 12.

Hereinafter, the negative electrode, the positive electrode, the nonaqueous electrolyte, the separator, the container member, the positive electrode terminal, and the negative electrode terminal used in the nonaqueous electrolyte battery according to the embodiment will be described in detail.

(Negative electrode)

A negative electrode used in a nonaqueous electrolyte battery such as a lithium ion secondary battery generally has a structure in which a negative electrode active material layer (negative electrode mixed-materials layer) is formed on a current collector. In addition to a negative electrode active material, a binder for binding the negative electrode active materials to each other and for binding the negative electrode active material and the current collector is used in the negative electrode mixed-materials layer.

A fluorine-based resin (for example, PVdF) or a modified substance thereof which is a binder, easily swells with respect to the nonaqueous electrolyte at a high temperature. Accordingly, in a battery including a negative electrode using the fluorine-based resin and the modified substance as the binder, network of an electron conduction of the negative electrode is disconnected as charge-and-discharge cycles proceed at a high temperature. As a result, internal resistance of the negative electrode is increased, which deteriorates a high temperature cycle performance of the battery.

Meanwhile, an acrylic resin is a binder which is difficult to swell at a high temperature with respect to the nonaqueous electrolyte as compared with the fluorine-based resin (PVdF and the like) or the modified substance thereof. However, when the acrylic resin is used as the binder, defects may occur when the negative electrode is manufactured. Indeed, the present inventors attempted to manufacture a negative electrode using the acrylic resin as the binder, and as a result, the following defects were found. Specifically, the acrylic resin as the binder, an active material, and carbon as a conductive agent were dispersed in a dispersant (N-methyl-2-pyrrolidone) to prepare slurry. The slurry was applied on an aluminum foil as the current collector. Here, the slurry was repelled from the aluminum foil, such that the slurry could not be applied with a desired film thickness. Otherwise, even though the slurry was able to be applied, it was found that adhesion property between the current collector and the negative electrode mixed-materials layer was deteriorated.

This phenomenon is particularly remarkable when titanium-including metal oxide particles are used as the negative electrode active materials. Accordingly, when the titanium-including metal oxide particles are used as the negative electrode active material in the nonaqueous electrolyte battery, it is difficult to obtain a nonaqueous electrolyte battery having excellent output performance while simultaneously having excellent high temperature durability (cycle performance) only by simply replacing the binder with an acrylic resin for the purpose of improvement in high temperature durability of the battery, without implementing any measures.

In the nonaqueous electrolyte battery according to the first embodiment, the negative electrode has a configuration that includes titanium-including metal oxide particles, which are able to have lithium ions inserted and extracted, and the negative electrode mixed-materials layer including the binder, and the binder includes the acrylic resin. The negative electrode current collector may include a metal foil as described below. The titanium-including metal oxide particle has a phase including a carbon material on at least a portion of a surface thereof.

The negative electrode included in the nonaqueous electrolyte battery according to the embodiment includes a negative electrode current collector and a negative electrode mixed-materials layer. The negative electrode mixed-materials layer includes a negative electrode active material, a conductive agent, and a binder. The negative electrode mixed-materials layer is formed on one surface or both of reverse surfaces of the negative electrode current collector.

The peel strength $\alpha$ (unit: kN/m) between the negative electrode current collector and the negative electrode mixed-materials layer, which is measured by the surface/interface cutting method, and the cutting strength β (unit: kN/m) in the negative electrode mixed-materials layer, which is measured by the surface/interface cutting method, satisfy a relationship of α/β>6. When the negative electrode having such a configuration is used, it is possible to obtain a nonaqueous electrolyte battery having excellent output performance and excellent high temperature durability (cycle performance). Further, the peel strength α and the cutting strength β preferably satisfy α/β<7. When α/β is 7 or more, excellent high temperature durability may not be obtained.

The negative electrode having the configuration may be manufactured by suitably controlling conditions for manufacturing the negative electrode. As described later, in manufacturing the negative electrode, the negative electrode mixed-materials layer is formed by applying a slurry including materials of the negative electrode mixed-materials layer onto the negative electrode current collector. Here, when the acrylic resin is used as the binder and an aluminum foil is used as the current collector, the binder may preferentially bind between the active materials, and as a result, adhesion property between the current collector and the mixed-materials layer may be deteriorated. In the above-described negative electrode that includes the negative electrode active material having a phase including a carbon material on at least a portion of the surface thereof, and that satisfies a relationship between the peel strength α and the cutting strength β of α/β>6, the negative electrode active materials are not bound together preferentially over binding between the negative electrode mixed-materials layer and the negative electrode current collector. Therefore, such a negative electrode has excellent adhesion property between the negative electrode mixed-materials layer and the negative electrode current collector.

In addition, the peel strength α of the negative electrode current collector and the negative electrode mixed-materials layer which is measured by the surface/interface cutting method is preferably 1.1 kN/m to 20 kN/m. When the peel strength α is less than 1 kN/m, the adhesion property between the mixed-materials layer and the current collector is insufficient, which may hinder manufacture of the negative electrode. Further, the negative electrode mixed-materials layer may be peeled off from the negative electrode current collector upon charge-and-discharge cycles, such that resistance of a battery may be increased, which may deteriorate the cycle performance. When the peel strength α is more than 20 kN/m, the negative electrode itself is hard and easily becomes brittle. In this case, it is easy to hinder manufacture of the battery. Further, the peel strength α between the negative electrode current collector and the negative electrode mixed-materials layer is more preferably 2.0 kN/m to 15 kN/m.

Further, the cutting strength β is preferably 0.18 kN/m to 3.33 kN/m. When the cutting strength β is less than 0.18 kN/m, the binding property with the current collector may be insufficient even when α/β>6 is satisfied, such that the mixed-materials layer may be easily peeled off from the current collector. On the other hand, when the cutting strength is more than 3.33 kN/m, the electrode easily becomes hard, which may cause a problem in a process in which flexibility of the electrode is required, such as winding during the manufacture of an electrode group. Further, the cutting strength β of the negative electrode mixed-materials layer is more preferably 0.2 kN/m to 3.0 kN/m.

Even when the peel strength α and the cutting strength β satisfy the above-described ranges, it may be difficult to handle the negative electrode when the ratio thereof (α/β) is 6 or less. For example, as long as the ratio (α/β) is larger than 1, the adhesion property between the mixed-materials layer and the current collector is able to be ensured. Here, when the cutting strength β is comparatively high, for example, the same as the peel strength α (the ratio (α/β) is about 1), it is possible to provide a stable electrode even for a large volume change of the active material according to charge and discharge since strength in the mixed-materials layer is high. On the other hand, it is preferred to reduce the cutting strength β in order to maintain flexibility of the electrode or coating property of a mixed-materials layer material at the time of manufacturing the electrode. In the negative electrode included in the nonaqueous electrolyte battery of the embodiment, the cutting strength β of the negative electrode mixed-materials layer is lower than the peel strength α between the negative electrode current collector and the negative electrode mixed-materials layer, and the ratio α/β is larger than 6. Accordingly, by using this negative electrode, excellent electrode performance and robustness at the time of manufacturing the battery can be achieved.

Further, the ratio (α/β) between the peel strength α and the cutting strength β in the negative electrode reflects the interaction between the binder and the active material and a dispersion state of the binder in the electrode. When the functional group such as a nitrile group of the binder is preferentially bonded to oxide of titanium which is the active material, even when the binder is uniformly dispersed, the cutting strength β is increased with respect to the peel strength α, such that the ratio α/β is not larger than 6.

Further, for example, when the binder is biased towards a surface of an electrode due to a manufacturing process of the electrode, for example, the peel strength α may be largely deteriorated. In this case too, the ratio α/β is not larger than 6. On the other hand, for example, when binder particles are biased around the current collector, and thus an amount of the binder in parts other than the vicinity of the current collector inside the mixed-materials layer may be reduced, the ratio α/β may therefore become larger than 6. In this case, since peeling of the mixed-materials layer from the current collector is sufficiently suppressed, it is possible to expect a certain effect in improving the coating property. However, the strength of the mixed-materials layer in the obtained electrode may be weakened. As described above, it is preferred that deviation in a concentration distribution in a thickness direction is small in the dispersion state of the binder in the electrode, and the dispersion state is uniform.

In the nonaqueous electrolyte battery according to the first embodiment, the negative electrode mixed-materials layer includes as the negative electrode active materials a titanium-including metal oxide into which lithium ions are inserted and from which lithium ions are extracted. The titanium-including metal oxide is included in the negative electrode mixed-materials layer, for example, in particulate form. The titanium-including metal oxide particles preferably have an average particle diameter of 100 nm to 3.0 μm.

The titanium-including metal oxide particles may include a particle including at least one selected from the group consisting of spinel type lithium titanate, monoclinic titanium dioxide ($TiO_2(B)$), monoclinic titanium composite oxide, niobium-titanium composite oxide represented by General Formula $Ti_{1-x}M_{x+y}Nb_{2-y}O_{7-\delta}$ ($0 \leq x < 1$, $0 \leq y < 1$, M is at least one element selected from the group consisting of Mg, Fe, Ni, Co, W, Ta, and Mo), and orthorhombic Na-including niobium-titanium composite oxide represented by General Formula $Li_{2+v}Na_{2-w}M1_xTi_{6-y-z}Nb_yM2_zO_{14+\delta}$ ($0 \leq v \leq 4$, $0 < w < 2$, $0 \leq x < 2$, $0 < y < 6$, $0 \leq z < 3$, $y+z < 6$, $-0.5 \leq \delta \leq 0.5$, M1 is at least one kind of element selected from the group consisting of Cs, K, Sr, Ba, and Ca, and M2 is at least one kind of element selected from the group consisting of Zr, Sn, V, Ta, Mo, W, Fe, Co, Mn, and Al). As the titanium-including metal oxide particle, one of the particles above may be used alone, or two or more thereof may be used in combination.

In the nonaqueous electrolyte battery according to the first embodiment, the titanium-including metal oxide particles included in the negative electrode have a phase including a carbon material on at least a portion of a surface thereof. When the titanium-including metal oxide having a phase including the carbon material on at least a portion of the surface is used as the negative electrode active material, wettability of a surface of the current collector with respect to the slurry for forming the negative electrode mixed-materials layer is improved. By doing so, the adhesion property between the negative electrode current collector and the negative electrode mixed-materials layer may be further improved. This is because, for example, it is possible to suppress occurrence of a phenomenon in which the slurry is repelled from the aluminum foil as the current collector, which is a so-called repellent phenomenon, and to prevent deterioration of the peel strength between the current collector and the mixed-materials layer. That is, the phase including the carbon material is disposed on at least a portion of the surface of the titanium-including metal oxide particles, such that defects at the time of manufacturing the negative electrode as described above may be more suppressed, thereby improving the adhesion property between the negative electrode current collector and the negative electrode mixed-materials layer. In addition, the phase including the carbon material may be, for example, formed on a portion of the surface of the titanium-including metal oxide particles. An example of a method for forming the phase including the carbon material on the surface of titanium-including metal oxide particles will be described below.

When an acrylic resin is used as the binder and an aluminum foil is used, for example, as the current collector, if the phase including the carbon material is not formed on at least a portion of the surface of the titanium-including metal oxide particles, the binder may preferentially bind between the active materials as described above. It is expected that the reason is because of the interaction between a surface of the active material and a surface functional group of the binder. Further, as described above, this phenomenon is particularly remarkable when the titanium-including metal oxide particles are used as the negative electrode active materials. The phase including the carbon material is disposed on at least a portion of the surface of the titanium-including metal oxide particles, thereby avoiding the binder from being preferentially used for binding between the active materials due to the interaction between the active material and the acrylic resin. Accordingly, it is possible to manufacture a negative electrode having excellent adhesion property between the current collector and the mixed-materials layer at a higher probability.

The carbon material phase disposed on the surface of the titanium-including metal oxide particle as the active material may exhibit other effects such as imparting conductivity, separately from the above-described effect. In the nonaqueous electrolyte battery of the embodiment, since the acrylic resin is used as the binder in the negative electrode mixed-materials layer, the effect of avoiding the preferential binding between the active materials has large influence. Further, as described above, since the titanium-including metal oxide particles are used, benefits of the phase of the carbon material disposed on the surface thereof are more greatly expressed.

It is preferred that the phase of the carbon material disposed on the surface of the titanium-including metal oxide particles preferably includes 0.5 wt % to 5 wt % of carbon based on a weight of the titanium-including metal oxide particle. When the amount of the carbon material included in the phase of the carbon material, i.e., a ratio of the surface occupied by the phase of the carbon material with respect to the weight of the titanium-including metal oxide is less than 0.5 wt %, there is a possibility that the preferential binding between the active materials may not be sufficiently avoided. When the amount of carbon is more than 5 wt %, the active material has an increased volume, and thus, an electrode density may not be sufficiently increased.

Further, in Raman chart obtained by Raman spectroscopy measurement using a measurement light source of 532 nm, the carbon material preferably satisfies a ratio $I_G/I_D$ of a peak intensity $I_G$ of a G band to a peak intensity $I_D$ of a D band of from 0.8 to 1.2. The G band is observed at 1530 $cm^{-1}$ to 1630 $cm^{-1}$ in the Raman chart. The D band is observed at 1280 $cm^{-1}$ to 1380 $cm^{-1}$ in the Raman chart. Details of the Raman spectroscopy are described below.

In the nonaqueous electrolyte battery according to the first embodiment, the negative electrode mixed-materials layer may include a conductive agent. Examples of the conductive agent may include carbonaceous materials such as graphite, acetylene black, carbon black, carbon nanofiber, and carbon nanotube. These carbonaceous materials may be used alone, or plural carbonaceous materials may be used.

In addition, in the nonaqueous electrolyte battery according to the first embodiment, the binder includes an acrylic resin (acrylic polymer). The acrylic resin may be a polymer or a copolymer. Alternatively, the acrylic resin may include both the polymer and the copolymer.

The acrylic resin is difficult to swell with respect to the nonaqueous electrolyte at a high temperature, and even when the charge-and-discharge cycles are repeated at a high temperature, the network of the electron conduction of the negative electrode is maintained. Accordingly, in the battery including the negative electrode using the acrylic resin, an increase of battery resistance at a high temperature is suppressed, such that a high temperature cycle performance of the battery is improved.

Examples of a monomer constituting the acrylic resin (acrylic polymer) include a monomer having an acrylic group and a monomer having a methacryl group. The monomer having an acrylic group is typically acrylic acid or acrylate. The monomer having a methacryl group is typically methacrylic acid or methacrylate.

Examples of the monomer constituting the acrylic resin (acrylic polymer) include ethyl acrylate, methyl acrylate, butyl acrylate, 2-ethylhexyl acrylate, isononyl acrylate, hydroxyethyl acrylate, methyl methacrylate, glycidyl methacrylate, acrylonitrile, styrene, and acrylamide.

As the acrylic resin (acrylic polymer), it is preferred to use a resin mainly composed of an acrylic resin including a nitrile group. Specifically, a resin mainly composed of polyacrylonitrile may be used. These binders are particularly strong in interaction with the titanium-including metal oxide particles which are the negative electrode active materials. It is presumably because an interaction between a surface functional group (nitrile group) in the acrylic resin such as polyacrylonitrile and a surface of the titanium-including metal oxide particle is strong. When such a binder is used, the above-described defects at the time of manufacturing the negative electrode occur easily. Accordingly, when a binder mainly composed of the acrylic resin including a nitrile group is used, it may be expected that the effect is more remarkably exhibited by adopting the configuration of the embodiment.

It is more preferred that the acrylic resin as the binder includes a methacrylate copolymer including a phosphate group. This is because the methacrylate copolymer including the phosphate group alleviates the interaction between the surface functional group (nitrile group) of the acrylic resin and the surface of the titanium-including metal oxide particles. In order to obtain the acrylic resin including such a methacrylate copolymer, for example, the acrylic resin and the methacrylate resin may be mixed. When the acrylic resin and the methacrylate resin are mixed, a mixing ratio of the acrylic resin is preferably 50 wt % to 90 wt %. When an amount of the acrylic resin is 50 wt % or more, excellent binding property is obtained. When the amount of the acrylic resin is 90 wt % or less, properties and condition of slurry are stabilized at the time of manufacturing the mixed-materials layer.

In addition, a weight average molecular weight (Mw) of the binder is preferably 10,000 to 50,000,000. When the Mw is 10,000 or more, sufficient binding property is obtained. Further, when the Mw is 50,000,000 or less, viscosity characteristic and dispersibility at the time of preparing the slurry in manufacturing the mixed-materials layer are stabilized.

In addition, as the binder, two or more kinds of acrylic resins may be mixed and used. In addition, one or more kinds of binders other than the acrylic resin may be included.

Examples of the binder other than the acrylic resin may include polyvinylidene fluoride (PVdF), other fluorinated rubber, polypropylene (PP), polyethylene (PE), carboxymethyl cellulose (CMC), polyimide (PI), and polyamideimide (PAI).

A proportion of the binder other than the acrylic resin is preferably 30 wt % or less of all the binders included in the negative electrode. More preferably, the proportion of the binder other than the acrylic resin is 10 wt % or less.

The negative electrode active material, the conductive agent, and the binder are preferably mixed at a mixing ratio as follows. The negative electrode active material preferably has a mixing ratio ranging from 0.70 mass % to 96 mass %. The negative electrode conductive agent preferably has a mixing ratio ranging from 2 mass % to 28 mass %. The binder preferably has a mixing ratio ranging from 2 mass % to 28 mass %.

When an amount of the conductive agent is less than 2 mass %, current collecting performance of the negative electrode mixed-materials layer may be lowered, and a high Current performance of the nonaqueous electrolyte battery may be lowered. In addition, when an amount of the binder is less than 2 mass %, the binding property between the negative electrode mixed-materials layer and the negative electrode current collector is lowered, and as a result, the resistance is increased, which may deteriorate the cycle performance. On the other hand, in view of high capacity, it is preferred that each of the conductive agent and the binder has an amount of 28 mass % or less.

A weight per unit area of the negative electrode mixed-materials layer is preferably 10 g/m$^2$ to 160 g/m$^2$. Here, in the case that the negative electrode mixed-materials layer is coated on both surfaces of the negative electrode current collector, the weight per unit area of the negative electrode mixed-materials layer refers to a weight of the negative electrode mixed-materials layer per either surface. Manufacture of the negative electrode mixed-materials layer in which the weight per unit area is less than 10 g/m$^2$ is not suitable for a mass production process. Further, when the weight per unit area of the negative electrode mixed-materials layer is more than 160 g/m$^2$, it is easy to hinder the manufacture of the negative electrode. A more preferable range of the weight per unit area of the negative electrode mixed-materials layer is 25 g/m$^2$ to 140 g/m$^2$.

It is preferred that the negative electrode mixed-materials layer disposed on the negative electrode current collector has a thickness per one surface of the current collector of 10 µm to 100 µm. A more preferable range of the thickness is 15 µm to 75 µm.

As the negative electrode current collector, a conductive foil may be used. Such a current collector may be, for example, a metal foil or a foil made of an alloy. It is preferred to use an aluminum foil or an aluminum alloy foil as the negative electrode current collector. The aluminum foil and the aluminum alloy foil preferably have a thickness of 20 µm or less, and more preferably, 15 µm or less. Accordingly, it is possible to reduce weight while maintaining strength of the negative electrode. The aluminum foil preferably has a purity of 99 wt % or more. As the aluminum alloy, alloys including elements such as Mg, Zn, and Si are preferred. On the other hand, when transition elements such as Fe, Cu, Ni, and Cr are included, content thereof is preferably 1 wt % or less.

It is more preferred that an undercoat layer is further formed on the surface of the negative electrode current collector. When a metal foil including an undercoat layer formed on a surface thereof is used as the current collector, wettability of the surface of the current collector to the slurry for forming the negative electrode mixed-materials layer is improved. By doing so, the adhesion property between the negative electrode current collector and the negative electrode mixed-materials layer may be further improved.

It is preferred that the undercoat layer formed on the surface of the negative electrode current collector includes a carbon material, and the thickness per one surface of the current collector is 2 µm or less. The carbon material included in the undercoat layer may be graphite, acetylene black, or carbon black. In addition, the undercoat layer may include a resin.

The negative electrode included in the nonaqueous electrolyte battery according to the first embodiment may be manufactured, for example, by the following method. First, a slurry is prepared by suspending the negative electrode active material, the conductive agent, and the binder in a solvent. The slurry is applied to one surface or both of reverse surfaces of the negative electrode current collector. Subsequently, the applied slurry is dried to form the negative electrode mixed-materials layer. Then, the current collector and the negative electrode mixed-materials layer are subjected to press processing. Here, the ratio ($\alpha/\beta$) between the peel strength $\alpha$ and the cutting strength $\beta$ in the negative electrode may have an appropriate value by controlling conditions of the method for manufacturing the negative electrode.

The peel strength $\alpha$ between the negative electrode mixed-materials layer and the negative electrode current collector may vary depending on kinds of materials such as the active material or the binder, used for the negative electrode mixed-materials layer, but is also affected by conditions for manufacturing the negative electrode. As described above, in manufacturing the negative electrode, the slurry including the negative electrode active material, the conductive agent, and the binder is applied on the negative electrode current collector, but the peel strength α may vary depending on a coating rate of the slurry or the thickness of a coating film. For example, as a result of reducing the coating speed, the peel strength α may be increased. Further, the negative electrode mixed-materials layer is formed by drying the slurry applied on the negative electrode current collector, but the peel strength α may vary depending on a drying temperature at this time.

The cutting strength β may vary depending on kinds of materials such as the active material or the binder, used for the negative electrode mixed-materials layer, and at the same time, is also affected by conditions for manufacturing the negative electrode, similar to the peel strength α. The cutting strength β may vary depending on the thickness of the slurry applied onto the negative electrode current collector. Further, in the manufacture of the negative electrode, the current collector and the negative electrode mixed-materials layer formed thereon are subjected to the press processing as described above, but the cutting strength β may also be changed depending on a press temperature at that time, i.e., a temperature of a roll used for the press processing.

The phase including the carbon material may be formed, for example, by firing a composite of the titanium-including metal oxide particle and the carbon-including compound at a temperature within a range of 650° C. to less than 900° C. under an inert atmosphere. Due to this firing, the active material may exhibit high electrical conductivity by converting the phase including the carbon-including compound into a phase including a carbon material having a high crystallinity.

The carbon-including compound as a carbon source is preferably a cyclic organic compound including two or more ring structures composed of a carbon framework. Such a compound may be, for example, saccharides such as sucrose, maltose, and glucose, polyolefins, nitriles, alcohols, organic compounds including benzene rings, and aromatic hydrocarbons such as pyrene, naphthalene, and chrysene. Since these cyclic organic compounds have a structure similar to graphite, carbonization is easy when firing is performed under reducing atmosphere. Accordingly, the phase including such a compound may be converted into a carbon material having good conductivity. More preferably, alcohols such as polyethylene glycol, allyl alcohol, and polyvinyl alcohol may be used as the carbon material capable of realizing a uniform surface coating form.

A method for forming the undercoat layer on the current collector is not particularly limited, but for example, the following method may be used. First, a carbon material such as graphite, acetylene black, or the like, is mixed with a solution in which the above-described resin is dissolved in a solvent, thereby preparing a coating material. The coating material is applied to an aluminum foil as a current collector, and then, dried to manufacture a current collector including an undercoat layer formed on a surface thereof. This current collector may be used to manufacture the negative electrode as described above by applying a slurry including a negative electrode active material, a conductive agent, and a binder on a surface (one surface or both surfaces) on which the undercoat layer is formed.

The peel strength α and the cutting strength β in the negative electrode may be measured by a surface/interface cutting method explained below.

The measurement of the cutting strength according to the surface/interface cutting method may be performed by using a cutting strength measurement device such as a surface and interfacial cutting analysis system (SAICAS) (registered trademark). In addition, the surface/interface cutting method may also be called SAICAS method. As the measurement device, for example, DN-GS from DAYPLA WINTES CO., LTD., may be used.

As a cutting knife, for example, a ceramic knife made of borazon and having a knife width of 1.0 mm is used. As measurement conditions, for example, a knife angle has a rake angle of 20 degrees and a clearance angle of 10 degrees. In the measurement of the cutting strength, first, cutting is performed at a shear angle of 45 degrees at a constant speed with a horizontal velocity of 2 μm/second and a vertical velocity of 0.2 μm/second, thereby moving a blade up to a predetermined depth in the negative electrode mixed-materials layer. After reaching a depth of 6 μm from the surface of the negative electrode, the cutting in a vertical direction is stopped and the cutting strength is measured in a constant speed mode at a horizontal speed of 2 μm/second.

In the measurement of the peel strength, first, the cutting in the vertical direction is performed with pressing load of 1N (constant load mode). At the point at which a load in a horizontal direction (horizontal force) applied to the knife is lowered due to the mixed-materials layer peeling off from the current collector, the load in the vertical direction is controlled to be 0.5 N, such that a position of the knife in the vertical direction is maintained to be constant. Then, the horizontal force (load in the horizontal direction) measured in a region where the horizontal force due to the peeling becomes constant is determined as the peel strength. Both a measurement temperature and a sample temperature are set to be at room temperature (25° C.).

The phase including a carbon component on the surface of the titanium-including metal oxide particle as the active material may be examined, for example, by Raman spectroscopy. In addition, the crystallinity of the carbon component may be quantitatively evaluated by a technique using a microscopic Raman measurement device. The microscopic Raman device may be, for example, ALMEGA manufactured by Thermo Fisher Scientific Company. Measurement conditions may be, for example, a measurement light source wavelength of 532 nm, a slit size of 25 μm, a laser intensity of 10%, an exposure time of 5 seconds, and a cumulative number of 10.

Raman spectroscopy measurement may be performed, for example, in the manner described below. At the time of evaluating an active material included in an electrode which is inserted in a battery, this battery is made to have a state in which lithium ions are completely extracted from the active material. For example, when a target active material is used as the negative electrode active material, the battery is made to be completely discharged. Although there may be a case where a small amount of residual lithium ions is present even in the discharged state, it does not largely affect results of the Raman spectroscopic measurement described below. Then, the battery is disassembled in a glove box filled with argon, and an electrode including the target active material is taken out. Subsequently, the removed electrode is washed with an appropriate solvent. Here, the solvent may be, for example, ethyl methyl carbonate. Then, the mixed-materials layer is peeled off from the washed electrode to obtain a sample. The obtained sample is used, and is subjected to, for example, Raman spectroscopy measurement according to the above-described conditions. In the obtained Raman chart, an intensity ratio ($I_G/I_D$) of these peaks may be examined by examining the presence of the G band observed at 1530 cm$^{-1}$ to 1630 cm$^{-1}$ and the D band observed at 1280 cm$^{-1}$ to 1380 cm$^{-1}$, respectively.

In the measurement, the presence or absence of Raman activity of the current collector and other components included in the mixture such as the conductive agent and the binder, and peak positions thereof are identified in advance. In the Raman spectrum obtained by measurement, there is a case where the peaks attributed to these components and a peak of the active material which is a measurement target overlap each other. In this case, it is possible to separate the peaks relating to components other than the active material from the measurement results based on the peak positions of other components that have been identified in advance.

Further, when the active material is mixed with the conductive agent in the electrode, it may be difficult to distinguish between the phase of the carbon material included in the active material and the carbon material mixed in the mixed-materials layer as the conductive agent. In such a case, the conductive agent component and the active material component may be distinguished by performing mapping from spectral components derived from the active material by, for example, mapping according to microscopic Raman spectroscopy. Thereafter, only the Raman spectrum corresponding to the active material component may be extracted and evaluated.

The presence of an acrylic resin as a binder in the negative electrode mixed-materials layer may be examined, for example, by pyrolysis-gas chromatography-mass/spectrometry (Py-GC/MS).

The component of the binder in the negative electrode mixed-materials layer may be examined, for example, in the following manner, using the pyrolysis-gas chromatography-mass/spectrometry (Py-GC/MS). First, a battery made in a fully discharged state (SOC 0%) is disassembled in a glove box filled with argon. A negative electrode which is the measurement target is taken out from the disassembled battery. The negative electrode is washed with an appropriate solvent. The solvent used for washing may be, for example, ethyl methyl carbonate. The negative electrode mixed-materials layer is peeled off from the negative electrode after washing, using a spatula type tool. Here, caution is required so as not to mix-in the negative electrode current collector. The peeled mixed-materials layer is set on a measurement holder, and measured. The measurement holder is preferably a stainless steel sample cup in which its surface is inactivated. An amount of the sample is preferably about 1 mg.

The Py-GC/MS measurement device may be, for example, PY-2020 id manufactured by Frontier Laboratories Ltd., as the Py (pyrolyzer) and 7890 GC/5975 CMSD manufactured by Agilent Technologies Japan, Ltd., as the GS/MS connected to the Py. In this apparatus, the sample can be automatically dropped into the center of the furnace of the pyrolysis apparatus using an automatic sampler. In this case, it is preferred that a pyrolysis temperature is set to be 600° C. in the measurement. Decomposition of the sample is performed in a stream of helium carrier gas at 50 ml/min, and a product is introduced online to the GC/MS via a splitter of 50:1. At this time, a temperature of an interface part connecting the pyrolysis apparatus to the GC/MS, and a temperature of a sample introduction part of the GC/MS are set to 320° C. A separation column may be a non-polar column, for example, a separation column including non-polar chemically bonded poly (5% phenyl) methylsiloxane as a fixed phase (film thickness of 0.25% μm). Detection of the separated product is performed by a quadrupole mass spectrometer directly connected thereto. The presence of the acrylic resin in the negative electrode mixed-materials layer may be examined by analyzing thus-obtained data.

The presence of the undercoat layer on the surface of the negative electrode current collector may be examined by observing a cross section of the negative electrode using scanning electron microscope (SEM) and performing energy dispersive X-ray spectroscopy (EDX). First, a battery made to be in a fully discharged state (SOC 0%) is disassembled in a glove box filled with argon. A negative electrode including the undercoat layer, which is the measurement target, is taken out from the disassembled battery. The negative electrode is washed with an appropriate solvent. The solvent used for washing may be, for example, ethyl methyl carbonate. When the washing is insufficient, it may be difficult to observe the undercoat layer due to an effect of lithium carbonate, lithium fluoride, or the like, remaining in the negative electrode.

The cross section of the negative electrode taken out as described above is cut with an ion milling device. The cross section of the cut negative electrode is attached to a SEM sample stand. Here, a treatment is performed using a conductive tape and the like, so that the negative electrode is not peeled off or partially detached from the sample stand. The negative electrode attached to the SEM sample stand is observed using the scanning electron microscope (SEM). It is preferred to introduce the negative electrode into a sample chamber in a state in which the negative electrode is maintained under an inert atmosphere at the time of the measurement with the SEM.

In a case where it is difficult to confirm whether there is the undercoat layer on the surface of the negative electrode current collector in SEM observation, it is possible to examine the presence or absence of the undercoat layer by performing element mapping using EDX. By performing SEM-EDX analysis, it is possible to visualize where elements are distributed, and thus, the presence or absence of the undercoat layer on the surface of the negative electrode current collector may be examined in more detail.

(Positive Electrode)

The positive electrode may include a positive electrode current collector and a positive electrode active material layer (positive electrode mixed-materials layer). The positive electrode mixed-materials layer may include a positive electrode active material, and optionally, a conductive agent, and a binder. The positive electrode mixed-materials layer may be formed on one surface or both of reverse surfaces of the positive electrode current collector.

The positive electrode active material may be, for example, an oxide or a sulfide. The positive electrode may include one kind of positive electrode active material or may include two or more kinds of positive electrode active materials. Examples of the oxide and the sulfide include manganese dioxide ($MnO_2$), iron oxide, copper oxide, nickel oxide, lithium-manganese composite oxide having a spinel structure (for example, $Li_xMn_2O_4$ or $Li_xMnO_2$), lithium-nickel composite oxide (for example, $Li_xCoO_2$), lithium-cobalt composite oxide (for example, $Li_xCoO_2$), lithium nickel-cobalt composite oxide (for example, $LiNi_{1-y}Co_yO_2$), lithium-manganese cobalt composite oxide (for example, $Li_xMn_yCo_{1-y}O_2$), lithium-nickel-cobalt-manganese composite oxide (for example, $LiNi_{1-y-z}Co_yMn_zO_2$), lithium-nickel-cobalt-aluminum composite oxide (for example, $LiNi_{1-y-z}Co_yAl_zO_2$), lithium-manganese-nickel composite oxide having a spinel structure (for example, $Li_xMn_{2-y}Ni_yO_4$)lithium phosphate having an olivine structure (for example, $Li_xFePO_4$, $Li_xMnPO_4$, $Li_xMn_{1-y}Fe_yPO_4$, $Li_xCoPO_4$), iron sulfate ($Fe_2(SO_4)_3$), and vanadium oxide (for example, $V_2O_5$), which are compounds capable of having Li inserted and extracted. In the above, it is preferred that $0<x\leq1$, $0\leq y\leq1$, and $0\leq z\leq1$ are satisfied. As the active material, these compounds may be used alone, or plural compounds may be used in combination.

Among them, the lithium-manganese composite oxide ($Li_xMn_2O_4$), the lithium-cobalt composite oxide ($Li_xCoO_2$), the lithium-nickel-cobalt composite oxide ($Li_xNi_{1-y}Co_yO_2$), the lithium-manganese-cobalt composite oxide ($Li_xMn_yCo_{1-y}O_2$), the lithium-nickel-cobalt-manganese composite oxide (for example, $LiNi_{1-y-z}Co_yMn_zO_2$), and the lithium phosphate having the olivine structure (for example, $Li_xFePO_4$, $Li_xMnPO_4$, $Li_xMn_{1-y}Fe_yPO_4$, $Li_xCoPO_4$) are preferred. In the above, it is preferred that $0<x\leq1$, $0\leq y\leq1$, and $0\leq z\leq1$ are satisfied.

Examples of the conductive agent include carbonaceous materials such as acetylene black, carbon black, graphite, carbon nanofiber, and carbon nanotube. These carbonaceous materials may be used alone, or plural carbonaceous materials may be used.

The binder fills gaps among dispersed positive electrode active materials to bind the positive electrode active material and the conductive agent, and to bind the positive electrode active material and the positive electrode current collector.

Examples of the binder may include, for example, polytetrafluoroethylene (PTFE), polyvinylidene fluoride (PVdF), polyvinylidene fluoride modified product (PVdF modified product), polyimide (PI), polyamideimide (PAI), and an acrylic resin (acrylic polymer).

Among them, the acrylic resin (acrylic polymer) does not easily swell with respect to the nonaqueous electrolyte at a high temperature, and even when charge-and-discharge cycles are repeated at a high temperature, network of electron conduction of the positive electrode is maintained. Accordingly, in the battery including the positive electrode using the acrylic resin as the binder, an increase of battery resistance at a high temperature is suppressed, and a high temperature cycle performance of the battery is improved, therefore preferable.

The acrylic resin (acrylic polymer) may be a polymer or a copolymer. Alternatively, the acrylic resin may include both the polymer and the copolymer.

Examples of a monomer constituting the acrylic resin (acrylic polymer) include a monomer having an acrylic group and a monomer having a methacryl group. The monomer having an acrylic group is typically acrylic acid or acrylate. The monomer having a methacryl group is typically methacrylic acid or methacrylate.

Examples of the monomer constituting the acrylic resin (acrylic polymer) include ethyl acrylate, methyl acrylate, butyl acrylate, 2-ethylhexyl acrylate, isononyl acrylate, hydroxyethyl acrylate, methyl methacrylate, glycidyl methacrylate, acrylonitrile, styrene, and acrylamide.

As the acrylic resin (acrylic polymer), it is preferred to use a resin mainly composed of an acrylic resin including a nitrile group. Specifically, a resin mainly composed of polyacrylonitrile may be used. As the binder, two or more kinds of acrylic resins may be mixed and used.

In addition, one or more kinds of binders other than the acrylic resin may be included. Examples of the binder other than the acrylic resin may include polyvinylidene fluoride (PVdF), other fluorinated rubber, polypropylene (PP), polyethylene (PE), carboxymethyl cellulose (CMC), polyimide (PI), and polyamideimide (PAI).

A proportion of the binder other than the acrylic resin is preferably 30 wt % or less of all the binders included in the positive electrode. More preferably, the proportion is 10 wt % or less.

The positive electrode active material, the conductive agent, and the binder in the positive electrode layer are preferably mixed at a mixing ratio as follows. The positive electrode active material preferably has a mixing ratio of 80 mass % to 95 mass %. The conductive agent preferably has a mixing ratio of 3 mass % to 18 mass. The binder preferably has a mixing ratio of 2 mass % to 17 mass %.

The proportion of the conductive agent is set to be 3 mass % or more, such that the network of electron conduction is maintained even when the charge-and-discharge cycles are repeated at a high temperature. Accordingly, an increase in battery resistance at a high temperature is suppressed. Further, the proportion of the conductive agent is determined to be 18 mass % or less, such that decomposition of the nonaqueous electrolyte on the surface of the conductive agent under high temperature storage may be reduced.

The proportion of the binder is set to be 2 mass % or more, such that a sufficient positive electrode strength is obtained. The proportion of the binder is set to be 17 mass % or less, such that a mixing amount of the binder, which is an insulation material, may be reduced in the positive electrode, thus internal resistance of the positive electrode can be reduced.

The positive electrode current collector is preferably an aluminum foil or an aluminum alloy foil including at least one element selected from the group consisting of Mg, Zn and Si.

The aluminum foil and the aluminum alloy foil preferably have a thickness of 20 μm or less, and more preferably, 15 μm or less. The aluminum foil preferably has a purity of 99 wt % or more. When transition metals such as Fe, Cu, Ni, and Cr are included, a content thereof is preferably 1 wt % or less.

The positive electrode mixed-materials layer preferably has a density of 3 $g/cm^3$ or more.

The positive electrode may be manufactured, for example, by the following method. A slurry is prepared by suspending a positive electrode active material, a binder and a conductive agent in an appropriate solvent. This slurry is applied to a surface of the positive electrode current collector. Subsequently, the applied slurry is dried to form the positive electrode mixed-materials layer. Then, the positive electrode current collector and the positive electrode mixed-materials layer are subjected to press processing. Examples of the organic solvent for dispersing the binder include N-methyl-2-pyrrolidone (NMP) and dimethylformamide (DMF). In addition, the positive electrode may be manufactured by forming the positive electrode active material, the binder and the conductive agent into a pellet form to manufacture the positive electrode mixed-materials layer, and disposing the positive electrode mixed-materials layer on the positive electrode current collector.

(Nonaqueous Electrolyte)

Examples of the nonaqueous electrolyte may include a liquid organic electrolyte prepared by dissolving an electrolyte in an organic solvent, a gel-like organic electrolyte including a composite of a liquid organic solvent and a polymer material, and a solid nonaqueous electrolyte including a composite of a lithium salt electrolyte and a polymer material. In addition, a room temperature molten salt (ionic melt) including lithium ions may be used as the nonaqueous electrolyte. Examples of the polymer material may include polyvinylidene fluoride (PVdF), polyacrylonitrile (PAN), and polyethylene oxide (PEO).

The nonaqueous electrolyte is preferably a liquid or a gel, has a boiling point of 100° C. or higher, and includes an organic electrolyte or the room temperature molten salt.

A liquid nonaqueous electrolyte is prepared, for example, by dissolving an electrolyte in an organic solvent at a concentration of 0.5 mol/L to 2.5 mol/L. Accordingly, it is possible to obtain a high output even in a low temperature environment. A more preferable range of an electrolyte concentration in the organic electrolyte is 1.5 mol/L to 2.5 mol/L.

Examples of the electrolyte may include lithium tetrafluoroborate ($LiBF_4$), lithium hexafluorophosphate ($LiPF_6$), lithium hexafluoro arsenate ($LiAsF_6$), lithium perchlorate ($LiClO_4$), lithium trifluoromethanesulfonate ($LiCF_3SO_3$), lithium bis(trifluoromethylsulfonylimide) ($LiN(CF_3SO_2)_2$), lithium bispentafluoroethylsulfonylimide ($LiN(C_2F_5SO_2)_2$), lithium tris trifluoromethylsulfonate ($Li(CF_3SO_2)_3C$), lithium oxalate difluoroborate ($LiBF_2C_2O_4$), and lithium bisoxalate borate ($LiB[(OCO)_2]_2$). One kind of the electrolyte or two or more kinds thereof may be used. Among them, it is preferred to include the lithium hexafluorophosphate. ($LiPF_6$) since it is difficult to oxidize even at a high electric potential.

Examples of the organic solvent may include cyclic carbonates such as propylene carbonate (PC) and ethylene carbonate (EC), linear carbonates such as diethyl carbonate (DEC), dimethyl carbonate (DMC), and methyl ethyl carbonate (MEC), linear ethers such as dimethoxyethane (DME) and diethoxyethane (DEE), cyclic ethers such as tetrahydrofuran (THF) and dioxolane (DOX), gamma-butyrolactone (GBL), acetonitrile (AN), and sulfolane (SL).

These organic solvents may be used alone or in a mixture form of two or more thereof.

In particular, a nonaqueous solvent that includes at least one kind of a first solvent selected from the group consisting of propylene carbonate (PC), ethylene carbonate (EC) and γ-butyrolactone (GBL); and a second solvent including at least one kind of linear carbonate selected from the group consisting of diethyl carbonate (DEC), methyl ethyl carbonate (MEC), and dimethyl carbonate (DMC) has high stability at a high electric potential of 4.4 V to 4.5 V. Accordingly, when such the nonaqueous solvent is used, it is possible to improve cycle life performance of a nonaqueous electrolyte battery. In particular, the nonaqueous solvent including ethylene carbonate and diethyl carbonate is stable at a high electric potential of 4.4 V to 4.5 V, thereby suppressing oxidation decomposition of the nonaqueous electrolyte.

In the nonaqueous solvent including the first solvent and the second solvent, a mixing ratio of the second solvent is preferably 70 vol % or more.

The nonaqueous electrolyte may further include an additive. The additive is not particularly limited, but may include, for example, vinylene carbonate (VC), vinylene acetate (VA), vinylene butyrate, vinylene hexanoate, vinylene crotonate, catechol carbonate, propane sultone, and lithium difluorophosphate ($LiPF_2O_2$).

In particular, it is preferred to include lithium difluorophosphate ($LiPF_2O_2$) as the additive. Accordingly, high temperature durability may be greatly improved.

The additive preferably has a concentration ranging from 0.1 mass % to 3 mass % with respect to 100 mass % of the nonaqueous electrolyte. A more preferable range of the concentration of the additive is from 0.5 mass % to 2.5 mass %.

(Separator)

As the separator, for example, there may be used a porous film or synthetic resin nonwoven fabric made of a material such as polyethylene (PE), polypropylene (PP), polyethylene terephthalate (PET), cellulose, or polyvinylidene fluoride (PVdF). Furthermore, a separator having inorganic compounds applied onto the porous film may also be used.

(Container Member)

As the container member, a bag-shaped container made of a laminate film or a metal case may be used.

Examples of the shape of the container member include flat form, square form, cylindrical form, coin-shaped, button-shaped, sheet form, stack form. Certainly, the container member may be that for a compact battery installed on mobile electronic devices, or a large battery installed on vehicles such as two- to four-wheel automobiles.

As the laminate film, used is a multilayer film having a metal layer sandwiched between resin films. The metal layer is preferably an aluminum foil or an aluminum alloy foil, so as to reduce weight. The resin film may be, for example, a polymeric material such as polypropylene (PP), polyethylene (PE), nylon, or polyethylene terephthalate (PET). The laminate film may be heat-sealed to be formed into the shape of a container member. The film thickness of the laminate film is preferably 0.2 mm or less.

The metal case may be formed of aluminum or an aluminum alloy. The aluminum alloy preferably includes at least one element selected from the group consisting of magnesium, zinc, and silicon. On the other hand, an amount of a transition metal such as iron, copper, nickel, or chromium included in the alloy is preferably 1% by mass or less. Thereby, long-term reliability and heat radiating abilities under high temperature environments can be increased greatly. The wall thickness of the metal case is more preferably 0.5 mm or less, and still more preferably 0.2 mm or less.

(Negative electrode terminal)

The negative electrode terminal may be made of, for example, a material that is electrically stable within the potential range of 1.0 V to 3.0 V (vs. $Li/Li^+$) relative to the oxidation-and-reduction potential of lithium, and has electrical conductivity. The negative electrode terminal is preferably made of aluminum or an aluminum alloy including one or more selected from the group consisting of Mg, Ti, Zn, Mn, Fe, Cu, Si, and the like. The negative electrode terminal is preferably made of the same material as the negative electrode current collector in order to reduce contact resistance with the negative electrode current collector.

A portion on the negative electrode current collector not having a negative electrode mixed-material layer formed thereon may be used as a negative electrode current collecting tab. The negative electrode terminal may be welded onto the negative electrode current collecting tab. In the case that an undercoat layer is formed on the surface of the current collector, even if the undercoat layer is formed on the surface of the negative electrode current collecting tab, the negative electrode terminal can be welded onto there. Alternatively, a portion without the undercoat layer formed thereon may be treated as the negative electrode current collecting tab, and the negative electrode terminal may be welded there.

(Positive electrode terminal)

The positive electrode terminal may be made of, for example, a material that is electrically stable within the potential range of 3.0 V to 4.5 V (vs. $Li/Li^+$) relative to the oxidation-and-reduction potential of lithium, and has electrical conductivity. The positive electrode terminal is preferably made of aluminum or an aluminum alloy including one or more selected from the group consisting of Mg, Ti, Zn, Mn, Fe, Cu, Si, and the like. The positive electrode terminal is preferably made of the same material as the positive electrode current collector in order to reduce contact resistance with the positive electrode current collector.

According to the first embodiment described above, a nonaqueous electrolyte battery is provided. The nonaqueous electrolyte battery according to the embodiment includes a positive electrode, a negative electrode and a nonaqueous electrolyte, the negative electrode including a negative electrode current collector, a titanium-including metal oxide particle capable of having lithium ions inserted and extracted, and a binder. The negative electrode of the nonaqueous electrolyte battery includes the negative electrode current collector, and a negative electrode mixed-materials layer disposed on the negative electrode current collector. Here, the titanium-including metal oxide particles and the binder form the negative electrode mixed-materials layer disposed on the negative electrode current collector. The binder includes an acrylic resin. When a peel strength between the negative electrode current collector and the negative electrode mixed-materials layer as measured by a surface/interface cutting method is designated as $\alpha$ (kN/m), and a cutting strength in the negative electrode mixed-materials layer as measured by the surface/interface cutting method is designated as $\beta$ (kN/m), these $\alpha$ and $\beta$ satisfy a relationship of $\alpha/\beta>6$. Due to this configuration, the nonaqueous electrolyte battery has a negative electrode excellent in adhesion property between the negative electrode current collector and the negative electrode mixed-materials layer. Therefore, the nonaqueous electrolyte battery has excellent high temperature durability (cycle performance).

(Second Embodiment)

According to a second embodiment, a battery pack is provided. The battery pack includes the nonaqueous electrolyte battery according to the first embodiment.

The battery pack according to the second embodiment may include one or more nonaqueous electrolyte batteries (unit cells) according to the first embodiment described above. The plural nonaqueous electrolyte batteries, which may be included in the battery pack according to the second embodiment, may be electrically connected in series, in parallel, or in a combination of in a series and in parallel. The plural nonaqueous electrolyte batteries may be electrically connected in series or in parallel, to structure a battery module. The battery pack according to the second embodiment may include plural battery modules.

The battery pack according to the second embodiment may further include a protective circuit. The protective circuit has a function to control charging and discharging of the nonaqueous electrolyte battery. Alternatively, a circuit included in equipment where the battery pack serves as a power source (for example, electronic devices, vehicles, and the like) may be used as the protective circuit for the battery pack.

Moreover, the battery pack according to the second embodiment may further comprise an external power distribution terminal. The external power distribution terminal is configured to externally output current from the nonaqueous electrolyte battery, and to input current to the nonaqueous electrolyte battery. In other words, when the battery pack is used as a power source, the current is externally provided via the external power distribution terminal. When the battery pack is charged, the charging current (including regenerative energy caused by power of vehicles such as automobiles) is provided to the battery pack via the external power distribution terminal.

Next, an example of a battery pack according to the second embodiment will be described with reference to the drawings.

Figure 5:
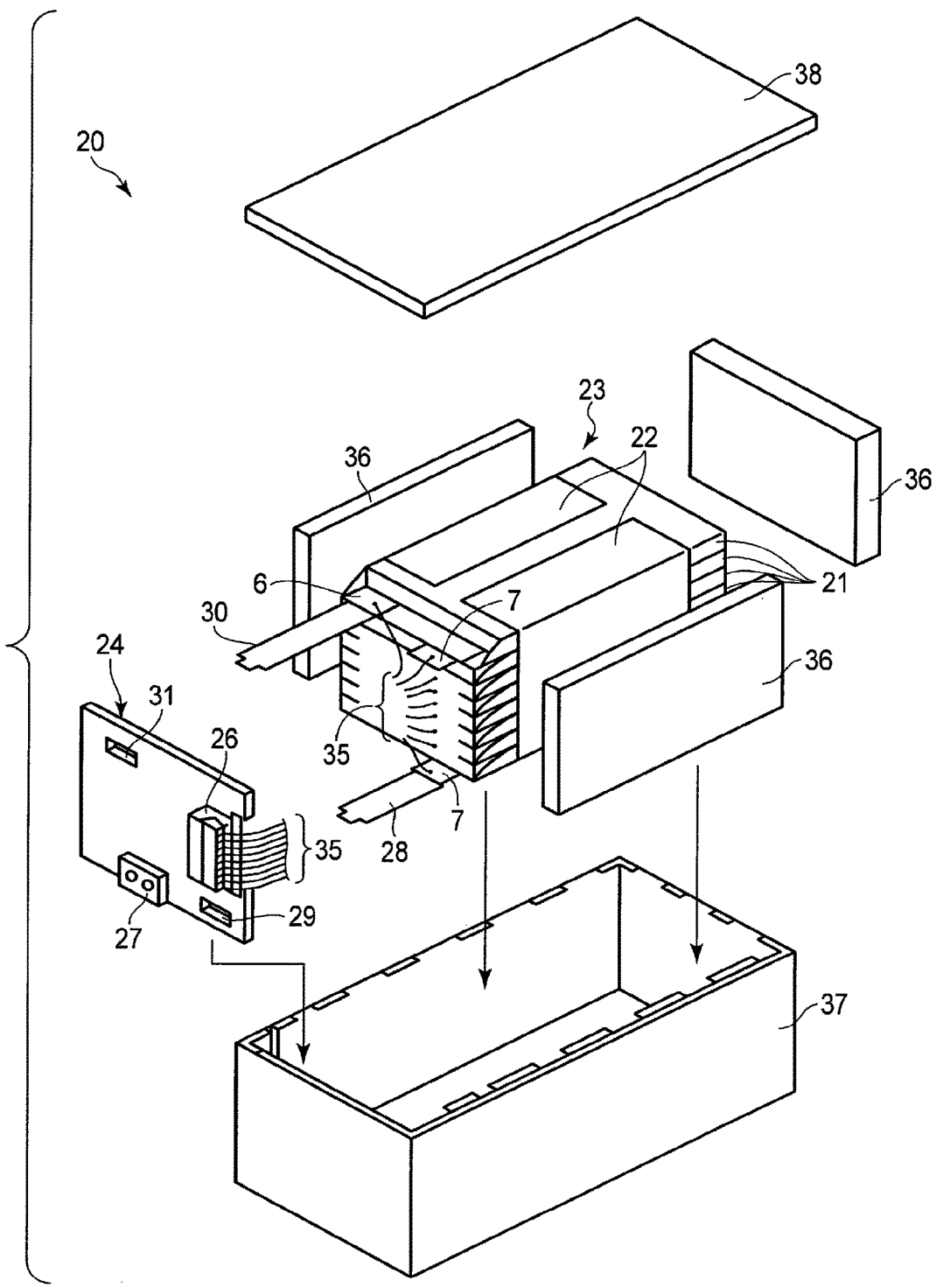
FIG. 5 is an exploded perspective view of an example of the battery pack according to a second embodiment.

FIG. 5 is an exploded perspective view of an example of the battery pack according to the second embodiment. FIG. 6 is a block diagram showing an electric circuit of the battery pack of FIG. 5.

A battery pack 20 shown in FIGS. 5 and 6 includes plural unit cells 21. The plural unit cells 21 are flat nonaqueous electrolyte batteries 10 described with reference to FIGS. 1 and 2.

Plural unit cells 21 are stacked so that the negative electrode terminals 6 and the positive electrode terminals 7 extended outside are arranged in the same direction, and fastened with an adhesive tape 22 to configure a battery module 23. The unit cells 21 are electrically connected to each other in series as shown in FIG. 6.

A printed wiring board 24 is disposed facing toward the side plane of the battery module 23 where the negative electrode terminal 6 and the positive electrode terminal 7 extend out from. A thermistor 25, a protective circuit 26, and an external power distribution terminal 27 are mounted on the printed wiring board 24 as shown in FIG. 6. An electric insulating plate (not shown) is attached to the surface of the printed wiring board 24 facing the battery module 23 to avoid unnecessary connection of the wires of the battery module 23.

A positive electrode-side lead 28 is connected to the positive electrode terminal 7 located at the bottom layer of the battery module 23 and the distal end of the lead 28 is inserted into a positive electrode-side connector 29 of the printed wiring board 24 so as to be electrically connected. A negative electrode-side lead 30 is connected to the negative electrode terminal 6 located at the top layer of the battery module 23 and the distal end of the lead 30 is inserted into an negative electrode-side connector 31 of the printed wiring board 24 so as to be electrically connected. The connectors 29 and 31 are connected to the protective circuit 26 through wires 32 and 33 formed on the printed wiring board 24.

The thermistor 25 detects the temperature of the unit cells 21, and the detection signal is sent to the protective circuit 26. The protective circuit 26 can shut down a plus-side wire 34a and a minus-side wire 34b between the protective circuit 26 and the external power distribution terminal 27, under a predetermined condition. The predetermined condition indicates, for example, the case where the temperature detected by the thermistor 25 becomes a predetermined temperature or more. Another example of the predetermined condition is when over-charge, over-discharge, or over-current of the unit cells 21 is detected. The detection of the over-charge and the like is performed on each of the unit cells 21 or the entire battery module 23. When each of the unit cells 21 is detected, the cell voltage may be detected, or positive electrode or negative electrode potential may be detected. In the latter case, a lithium electrode to be used as a reference electrode is inserted into each of the unit cells 21. In the case of the battery pack 20 of FIGS. 5 and 6, wires 35 for voltage detection are connected to each of the unit cells 21. Detection signals are sent to the protective circuit 26 through the wires 35.

Protective sheets 36 made of rubber or resin are arranged on three side planes of the battery module 23 except the side plane from which the positive electrode terminal 7 and the negative electrode terminal 6 protrude out.

The battery module 23 is housed in a housing container 37 together with each of the protective sheets 36 and the printed wiring board 24. That is, the protective sheets 36 are arranged on both internal surfaces in a long side direction and on one internal surface in a short side direction of the housing container 37. The printed wiring board 24 is arranged on the internal surface on the opposite side in a short side direction. The battery module 23 is located in a space surrounded by the protective sheets 36 and the printed wiring board 24. A lid 38 is attached to the upper surface of the housing container 37.

In order to fix the battery module 23, a heat-shrinkable tape may be used instead of the adhesive tape 22. In such a case, the battery module is fastened by placing the protective sheets on both side surfaces of the battery module, revolving the heat-shrinkable tape around the battery module, and thermally shrinking the heat-shrinkable tape.

In FIGS. 5 and 6, an embodiment has been shown where plural unit cells 21 are connected in series; however, the connection may be made in parallel in order to increase battery capacity. Alternatively, connection in series may be combined with connection in parallel. Assembled battery packs may be connected further in series and/or in parallel.

Furthermore, although the battery pack shown in FIGS. 5 and 6 include plural unit cells 21, the battery pack according to the second embodiment may include only one unit cell 21.

The aspect of the battery pack according to the second embodiment may be appropriately changed depending on its application. The battery pack according to the second embodiment can be suitably used in applications in which cycle performance is demanded to be excellent when large current is taken out. Specifically the battery pack is used as a power source of a digital camera, as a battery for installing on a vehicle such as a two- to four-wheeled hybrid electric automobile, a two- to four-wheeled electric automobile, a power-assisted bicycle, or a rail way car, or as a stationary battery. In particular, the battery pack is suitably used for a battery installed on a vehicle.

In a vehicle, such as an automobile and the like, that includes the battery pack according to the second embodiment, the battery pack is configured, for example, to recover regenerative energy caused by power of the vehicle. Examples of the vehicle include two to four-wheeled hybrid electric automobiles, two to four-wheeled electric automobiles, electric assist bicycles, and rail way cars such as electric trains.

Figure 7:
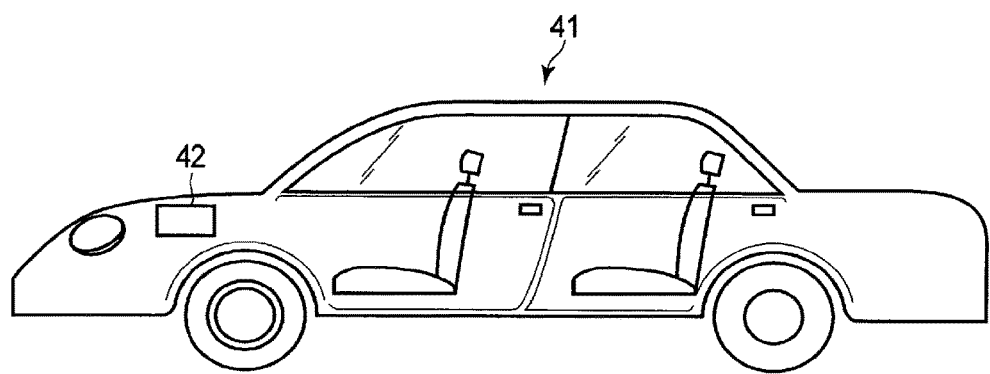
FIG. 7 is a schematic diagram showing an example of a vehicle including the battery pack according to the second embodiment.

FIG. 7 shows an example of an automobile that includes a battery pack according to the second embodiment.

The automobile 41 shown in FIG. 7 includes a battery pack 42, which is an example of the battery pack according to the second embodiment, installed in its engine compartment. There is concern that the interior temperature of the engine compartment may become high. Since the battery pack according to the second embodiment includes the nonaqueous electrolyte battery having excellent durability at high temperature, the battery pack can be used favorably, even when disposed in the engine compartment of an automobile, as shown in FIG. 7.

The position for installing the battery pack in an automobile is not limited to engine compartments. For example, the battery pack may also be installed in rear parts of automobiles (e.g., underneath the floor, on the rear side of seat backs, in lower portions in the trunk compartment) or under seats.

The battery pack according to the second embodiment includes the nonaqueous electrolyte battery according to the first embodiment. Thus, the battery pack according to the second embodiment can exhibit high durability at high temperature.

EXAMPLES

Although Examples are described below, the present invention is not limited to the following Examples unless it extends beyond the scope of the present invention.

Example 1

(Manufacture of Electrode)

First, with respect to a positive electrode, 90 wt % of $LiMn_2O_4$ powder as a positive electrode active material, 5 wt % of acetylene black as a conductive agent, and 5 wt % of polyvinylidene fluoride (PVdF) as a binder were added to N-methylpyrrolidone (NMP) and mixed to prepare a positive electrode slurry. The prepared positive electrode slurry was applied to both surfaces of a current collector made of aluminum foil having a thickness of 15 μm at a coating speed of 2.0 m/min, and a coating film of the slurry was dried at 130° C. to form a positive electrode mixed-materials layer. Then, the positive electrode mixed-materials layer was pressed at 25° C. to manufacture a positive electrode having an electrode density of 2.0 g/cm³.

With respect to a negative electrode, 90 wt % of $Li_4Ti_5O_{12}$ powder having a phase including a carbon material formed on the surface thereof as a negative electrode active material, 5 wt % of acetylene black as a conductive agent, and 5 wt % of a copolymer of acrylonitrile and acrylic acid (hereinafter referred to as an acrylic resin (A)) as a binder were added to N-methylpyrrolidone (NMP) and mixed to prepare a negative electrode slurry. The prepared negative electrode slurry was applied to both surfaces of a current collector made of aluminum foil having a thickness of 15 μm at a coating speed of 2.0 m/min, and a coating film of the slurry was dried at 130° C. to form a negative electrode mixed-materials layer. Then, the negative electrode mixed-materials layer was pressed at 25° C. to manufacture a negative electrode having an electrode density of 2.0 g/cm³.

(Manufacture of laminate cell)

The manufactured positive electrode, a separator made of a porous polyethylene film having a thickness of 25 μm, the manufactured negative electrode, and a separator were sequentially stacked, and then, wound in a spiral shape. This was subjected to heat-pressing at 90° C. to manufacture a flat electrode group having a width of 30 mm and a thickness of 3.0 mm. The obtained electrode group was housed in a pack made of a laminate film, and vacuum dried at 80° C. for 24 hours. The laminate film used herein had a configuration in which polypropylene layers were formed on both surfaces of aluminum foil having a thickness of 40 μm, and had a total thickness of 0.1 mm. A liquid nonaqueous electrolyte was prepared by dissolving 1.2M $LiPF_6$ as a salt of an electrolyte in a mixed solution in which polypropylene carbonate (PC) and diethyl carbonate (DEC) were mixed at a ratio of 1:1, and this liquid nonaqueous electrolyte was put into the pack of the laminate film housing the electrode group. Thereafter, the pack was completely sealed by heat sealing to manufacture a laminate cell type nonaqueous electrolyte battery having a width of 35 mm, a thickness of 3.2 mm, and a height of 65 mm.

Example 2

A nonaqueous electrolyte battery was manufactured in the same manner as in Example 1 except that $LiNi_{1/3}Co_{1/3}Mn_{1/3}O_2$ was used as a positive electrode active material.

Comparative Example 1

A nonaqueous electrolyte battery was manufactured in the same manner as in Example 1 except that $Li_4Ti_5O_{12}$ particles not having a phase including the carbon material formed on the surface thereof were used as a negative electrode active material.

Comparative Example 2

A nonaqueous electrolyte battery was manufactured in the same manner as in Example 1 except that $Li_4Ti_5O_{12}$ particles not having a phase including the carbon material formed on the surface thereof were used as a negative electrode active material, and that a negative electrode slurry was prepared by using PVdF as a binder.

Comparative Example 3

A nonaqueous electrolyte battery was manufactured in the same manner as in Example 1 except that a negative electrode slurry was prepared by using PVdF as a binder.

The positive electrode active material, the negative electrode active material, and an average particle diameter of particles of the negative electrode active material, the presence or absence of the phase of the carbon materials in the negative electrode active material, a carbon amount with respect to a weight of the active material of the phase of the carbon material, and the binder used for the negative electrode which were used in manufacturing the nonaqueous electrolyte batteries in Examples 1 to 2 and Comparative Examples 1 to 3 are summarized in Table 1 below.

TABLE 1

|  | Positive electrode Active material | Negative electrode | | | | |
|---|---|---|---|---|---|---|
|  |  | Active material | Average particle size of active material particle (nm) | Presence or absence of phase of carbon material | Amount of carbon in phase of carbon material (wt %) | Binder |
| Example 1 | $LiMn_2O_4$ | $Li_4Ti_5O_{12}$ | 800 | Present | 2 | Acrylic resin A |
| Example 2 | $LiNi_{1/3}Mn_{1/3}CO_{1/3}O_2$ | $Li_4Ti_5O_{12}$ | 800 | Present | 2 | Acrylic resin A |
| Comparative Example 1 | $LiMn_2O_4$ | $Li_4Ti_5O_{12}$ | 800 | Absent | — | Acrylic resin A |
| Comparative Example 2 | $LiMn_2O_4$ | $Li_4Ti_5O_{12}$ | 800 | Absent | — | PVdF |
| Comparative Example 3 | $LiMn_2O_4$ | $Li_4Ti_5O_{12}$ | 800 | Present | 2 | PVdF |

(Evaluation of crystallinity of carbon material)

Raman analysis was performed on the negative electrodes manufactured in Examples 1 to 2 and Comparative Examples 1 to 3 using a measurement light source of 532 nm by the above-described technique. In the obtained Raman chart, fitting by Lorentzian function was performed, and a G band observed at 1530 $cm^{-1}$ to 1630 $cm^{-1}$ and a D band observed at 1280 $cm^{-1}$ to 1380 $cm^{-1}$ were detected. A peak intensity ratio $I_G/I_D$ was calculated from peak intensity $I_G$ of the obtained G band and peak intensity $I_D$ of the obtained D band.

(Evaluation of peel strength and cutting strength)

With respect to Examples 1 to 2 and Comparative Examples 1 to 3, the peel strength ($\alpha$) and the cutting strength ($\beta$) of the manufactured negative electrodes were measured according to the surface/interface cutting method using surface and interfacial cutting analysis system (SA-ICAS) (registered trademark) according to the techniques and conditions described above.

The peak intensity ratio $I_G/I_D$, the peel strength $\alpha$, the cutting strength $\beta$, and the ratio $\alpha/\beta$ obtained with respect to Examples 1 to 2 and Comparative Examples 1 to 3 are summarized in Table 2 below.

TABLE 2

|  | Peak intensity ratio $I_G/I_D$ between G band and D band of carbon material | Peel strength $\alpha$ between negative electrode current collector and negative electrode mixed-materials layer (kN/m) | Cutting strength $\beta$ within negative electrode mixed-materials layer (kN/m) | $\alpha/\beta$ |
|---|---|---|---|---|
| Example 1 | 0.82 | 1.1 | 0.12 | 8.75 |
| Example 2 | 0.82 | 1.1 | 0.12 | 8.75 |

TABLE 2-continued

| | Peak intensity ratio $I_G/I_D$ between G band and D band of carbon material | Peel strength α between negative electrode current collector and negative electrode mixed-materials layer (kN/m) | Cutting strength β within negative electrode mixed-materials layer (kN/m) | α/β |
|---|---|---|---|---|
| Comparative Example 1 | Not detected | 0.85 | 0.33 | 2.58 |
| Comparative Example 2 | Not detected | 0.76 | 0.25 | 3.04 |
| Comparative Example 3 | 0.82 | 0.80 | 0.23 | 3.48 |

(Evaluation of performance)

Life performance under high temperature condition of the nonaqueous electrolyte batteries manufactured in Examples 1 to 2 and Comparative Examples 1 to 3 was respectively evaluated. Specifically, first, each battery was subjected to constant current-constant voltage charge, where the battery was charged at a constant current of 1 C up to 2.7V under a temperature condition of 25° C., and then charged at a constant voltage. This state was defined as SOC100%. Hereafter, capacity when the battery was discharged to 1.5V at a current value of 1 C was measured. The thus obtained capacity was defined as an initial charge and discharge capacity.

Then, 500 cycles of charge and discharge were performed in a voltage range of 1.5V to 2.7V at a charge current rate of 1 C and discharge current rate of 1 C under a temperature condition of 60° C. Here, one charge and one discharge were set as one cycle. After 500 cycles of charge and discharge were performed, the nonaqueous electrolyte battery was subjected again to the constant current-constant voltage charge, in which the battery was charged at a constant current of 1 C up to 2.7V under a temperature condition of 25° C., then charged at a constant voltage, and subsequently discharged to 1.5V at a rate of 1 C, thereby measuring the charge and discharge capacity after 500 cycles.

A value obtained by dividing the charge and discharge capacity after 500 cycles by the initial charge and discharge capacity was calculated as a capacity retention ratio after 500 cycles at 60° C. Capacity retention ratios of the nonaqueous electrolyte batteries of Examples 1 to 2 and Comparative Examples 1 to 3 after 500 cycles at 60° C., respectively, are summarized in Table 3 below.

TABLE 3

| | Capacity retention ratio after 500 cycles at 60° C. (%) |
|---|---|
| Example 1 | 95.0 |
| Example 2 | 99.5 |
| Comparative Example 1 | 91.0 |
| Comparative Example 2 | 89.2 |
| Comparative Example 3 | 91.5 |

As shown in Table 3, the nonaqueous electrolyte batteries manufactured in Examples 1 to 2 exhibited good high temperature durability. On the other hand, the nonaqueous electrolyte batteries manufactured in Comparative Examples 1 to 3 were inferior in high temperature durability as compared with those of Examples 1 to 2. In Examples 1 to 2, the negative electrodes included the titanium-including metal oxide particles having a phase of a carbon material formed on the surface thereof as an active material, and the binder including an acrylic resin. Meanwhile, the peel strength α between the negative electrode current collector and the negative electrode mixed-materials layer and the cutting strength β of the negative electrode mixed-materials layer were in a relationship of α/β>6, in Examples 1 to 2. On the other hand, in Comparative Examples 1 to 3, the negative electrode active material did not have the phase including the carbon material on a surface thereof and/or the negative electrode did not include the binder including the acrylic resin, and further, the peel strength α and the cutting strength β were in a relationship of α/β<6.

Results of charge and discharge tests at high temperature with respect to the nonaqueous electrolyte batteries of Examples 1 to 2 and Comparative Examples 1 to 3 clearly indicate that when the negative electrode which included titanium-including metal oxide particles having the phase including the carbon material on at least a portion of the surface as the active material, and the binder including the acrylic resin was included, and the ratio α/β of the peel strength α between the current collector and the mixed-materials layer to the cutting strength β of the mixed-materials layer in the negative electrode was larger than 6, good high temperature cycle performance was exhibited.

Next, results of investigation on nonaqueous electrolyte batteries using various titanium-including metal oxides as negative electrode active materials are shown in Examples 3 to 7 and Comparative Examples 4 to 8.

Example 3

A nonaqueous electrolyte battery was manufactured in the same manner as in Example 1 except that monoclinic titanium dioxide ($TiO_2(B)$) particles having a phase including a carbon material formed on the surface thereof were used as a negative electrode active material.

Example 4

A nonaqueous electrolyte battery was manufactured in the same manner as in Example 1 except that $Ti_{0.9}Mo_{0.2}Nb_{1.9}O_7$ particles having a phase including a carbon material formed on the surface thereof were used as a negative electrode active material.

Example 5

A nonaqueous electrolyte battery was manufactured in the same manner as in Example 1 except that $Li_2NaTi_5NbO_{14}$ particles having a phase including a carbon material formed on the surface thereof were used as a negative electrode active material, and that a negative electrode slurry was prepared by using a copolymer of acrylonitrile and methacrylic acid (hereinafter, referred to as an acrylic resin B) as a binder.

Example 6

A nonaqueous electrolyte battery was manufactured in the same manner as in Example 1 except that $Li_2NaTi_5NbO_{13.5}$ particles having a phase including a carbon material formed on the surface thereof were used as a negative electrode active material, and that a negative electrode slurry was prepared by using the acrylic resin B as a binder.

Example 7

A nonaqueous electrolyte battery was manufactured in the same manner as in Example 1 except that $Li_3Na_{0.5}Sr_{0.5}Ti_4Nb_2O_{14}$ particles having a phase including a carbon material formed on the surface thereof were used as a negative electrode active material, and that a negative electrode slurry was prepared by using the acrylic resin B as a binder.

Comparative Example 4

A nonaqueous electrolyte battery was manufactured in the same manner as in Example 1 except that monoclinic titanium dioxide ($TiO_2(B)$) particles not having a phase including a carbon material formed on the surface were used as a negative electrode active material.

Comparative Example 5

A nonaqueous electrolyte battery was manufactured in the same manner as in Example 1 except that $Ti_{0.9}Mo_{0.2}Nb_{1.9}O_7$ particles not having a phase including a carbon material formed on the surface were used as a negative electrode active material, and that a negative electrode slurry was prepared by using PVdF as a binder.

Comparative Example 6

A nonaqueous electrolyte battery was manufactured in the same manner as in Example 1 except that $Li_2NaTi_5NbO_{14}$ particles not having a phase including a carbon material formed on the surface were used as a negative electrode active material, and that a negative electrode slurry was prepared by using PVdF as a binder.

Comparative Example 7

A nonaqueous electrolyte battery was manufactured in the same manner as in Example 1 except that $Li_2NaTi_5NbO_{14}$ particles not having a phase including a carbon material formed on the surface were used as a negative electrode active material, and that a negative electrode slurry was prepared by using the acrylic resin (B) as a binder.

Comparative Example 8

A nonaqueous electrolyte battery was manufactured in the same manner as in Example 1 except that $Li_2NaTi_5MbO_{13.5}$ particles not having a phase including a carbon material formed on the surface were used as a negative electrode active material, and that a negative electrode slurry was prepared by using PVdF as a binder.

The positive electrode active material, the negative electrode active material, and an average particle diameter of particles of the negative electrode active material, the presence or absence of the phase of the carbon materials in the negative electrode active material, a carbon amount with respect to a weight of the active material of the phase of the carbon material, and the binder used for the negative electrode which were used in manufacturing the nonaqueous electrolyte batteries in Examples 3 to 7 and Comparative Examples 4 to 8 are summarized in Table 4 below.

TABLE 4

| | | Negative electrode | | | | |
|---|---|---|---|---|---|---|
| | Positive electrode Active material | Active material | Average particle size of active material particle (nm) | Presence or absence of phase of carbon material | Amount of carbon in phase of carbon material (wt %) | Binder |
| Example 3 | $LiMn_2O_4$ | $TiO_2(B)$ | 500 | Present | 3.0 | Acrylic resin A |
| Example 4 | $LiMn_2O_4$ | $Ti_{0.9}Mo_{0.2}Nb_{1.9}O_7$ | 5000 | Present | 1.2 | Acrylic resin A |
| Example 5 | $LiMn_2O_4$ | $Li_2NaTi_5NbO_{14}$ | 3000 | Present | 1.5 | Acrylic resin B |
| Example 6 | $LiMn_2O_4$ | $Li_2NaTi_5NbO_{13.5}$ | 3000 | Present | 1.3 | Acrylic resin B |
| Example 7 | $LiMn_2O_4$ | $Li_3Na_{0.5}Sr_{0.5}Ti_4Nb_2O_{14}$ | 3000 | Present | 1.2 | Acrylic resin B |
| Comparative Example 4 | $LiMn_2O_4$ | $TiO_2(B)$ | 500 | Absent | — | PVdF |
| Comparative Example 5 | $LiMn_2O_4$ | $Ti_{0.9}Mo_{0.2}Nb_{1.9}O_7$ | 5000 | Absent | — | PVdF |
| Comparative Example 6 | $LiMn_2O_4$ | $Li_2NaTi_5NbO_{14}$ | 3000 | Absent | — | PVdF |
| Comparative Example 7 | $LiMn_2O_4$ | $Li_2NaTi_5NbO_{14}$ | 3000 | Absent | — | Acrylic resin B |
| Comparative Example 8 | $LiMn_2O_4$ | $Li_2NaTi_5NbO_{13.5}$ | 3000 | Absent | — | PVdF |

With respect to the negative electrodes manufactured in Examples 3 to 7 and Comparative Examples 4 to 8, the peak intensity ratio $I_G/I_D$, the peel strength α, and the cutting strength β were calculated in the same manner as in Examples 1 to 2 and Comparative Examples 1 to 3. The obtained peak intensity ratio $I_G/I_D$, the peel strength α, the cutting strength β, and the ratio α/β are summarized in Table 5 below.

TABLE 5

| | Peak intensity ratio $I_G/I_D$ between G band and D band of carbon material | Peel strength α between negative electrode current collector and negative electrode mixed-materials layer (kN/m) | Cutting strength β within negative electrode mixed-materials layer (kN/m) | α/β |
|---|---|---|---|---|
| Example 3 | 1.05 | 1.33 | 0.20 | 6.65 |
| Example 4 | 1.17 | 1.59 | 0.22 | 7.2 |
| Example 5 | 1.02 | 1.41 | 0.14 | 10.07 |
| Example 6 | 0.91 | 1.25 | 0.16 | 7.81 |
| Example 7 | 0.97 | 1.30 | 0.14 | 9.29 |
| Comparative Example 4 | Not detected | 0.90 | 0.26 | 3.46 |
| Comparative Example 5 | Not detected | 1.46 | 0.29 | 5.03 |
| Comparative Example 6 | Not detected | 1.31 | 0.32 | 4.09 |
| Comparative Example 7 | Not detected | 1.29 | 0.38 | 3.39 |
| Comparative Example 8 | Not detected | 1.09 | 0.20 | 5.45 |

With respect to the nonaqueous electrolyte batteries manufactured in Examples 3 to 7 and Comparative Examples 4 to 8, a charge-and-discharge cycle test of 500 cycles at 60° C. was respectively performed in the same manner as in the nonaqueous electrolyte batteries of Examples 1 to 2 and Comparative Examples 1 to 3. Obtained capacity retention ratios after 500 cycles at 60° C. are summarized in Table 6 below.

TABLE 6

| | Capacity retention ratio after 500 cycles at 60° C. (%) |
|---|---|
| Example 3 | 91.0 |
| Example 4 | 88.0 |
| Example 5 | 89.0 |
| Example 6 | 91.3 |
| Example 7 | 90.1 |
| Comparative Example 4 | 82.7 |
| Comparative Example 5 | 81.0 |
| Comparative Example 6 | 81.8 |
| Comparative Example 7 | 85.5 |
| Comparative Example 8 | 78.2 |

As shown in Tables 4 and 5, all of the nonaqueous electrolyte batteries manufactured in Examples 3 to 7 included the negative electrode including titanium-including metal oxide particles having the phase including the carbon material on at least a portion of the surface as the active material, and the binder including the acrylic resin, and the ratio α/β of the peel strength α between the current collector and the mixed-materials layer to the cutting strength β of the mixed-materials layer in the negative electrode was larger than 6. In these Examples, good high temperature cycle performance had been exhibited as shown in Table 6. On the other hand, in Comparative Examples 4 to 8, the negative electrode active material did not have the phase including the carbon material on the surface thereof, and further, the negative electrode did not include the binder including the acrylic resin in Comparative Examples 4 to 6 and 8. Further, in these Comparative Examples, the ratio α/β of the peel strength α to the cutting strength β was 6 or less. As shown in Table 6, the nonaqueous electrolyte batteries of these Comparative Examples were inferior in high temperature durability as compared with the nonaqueous electrolyte batteries of Examples 3 to 7.

As shown in Examples 8 to 11 below, the peel strength α between the current collector and the mixed-materials layer and the cutting strength β of the mixed-materials layer can be controlled by controlling manufacture conditions of the electrode mixed-materials layer. Specifically, effects due to a coating speed at the time of applying the negative electrode slurry to the current collector, a drying temperature at the time of drying a coating film of the negative electrode slurry, and a press temperature at the time of pressing the negative electrode mixed-materials layer are shown.

Example 8

A nonaqueous electrolyte battery was manufactured using the same material as in Example 1 except that a copolymer of acrylonitrile and methacrylic acid (acrylic resin (B)) was used as a binder used in preparing a negative electrode slurry. In addition, various conditions at the time of manufacturing the negative electrode (the coating speed at the time of applying the negative electrode slurry to the current collector, the drying temperature at the time of drying the coating film of the negative electrode slurry, and the press temperature at the time of pressing the negative electrode mixed-materials layer) were set to conditions shown in Table 8 below.

Example 9

A nonaqueous electrolyte battery was manufactured in the same manner as in Example 8 except that a coating speed at the time of applying a negative electrode slurry to a current collector was changed to 0.5 m/min.

Example 10

A nonaqueous electrolyte battery was manufactured in the same manner as in Example 8 except that a temperature at which a coating film of a negative electrode slurry applied to a current collector was dried was changed to 80° C.

Example 11

A nonaqueous electrolyte battery was manufactured in the same manner as in Example 8 except that a press temperature at which a negative electrode mixed-materials layer obtained by drying a negative electrode slurry was pressed was changed to 80° C.

The positive electrode active material, the negative electrode active material, and an average particle diameter of particles of the negative electrode active material, the presence or absence of the phase of the carbon materials in the negative electrode active material, a carbon amount with respect to a weight of the active material of the phase of the carbon material, and the binder used for the negative electrode which were used in manufacturing the nonaqueous electrolyte batteries in Examples 8 to 11 are summarized in Table 7 below.

TABLE 7

| | | | Negative electrode | | | |
|---|---|---|---|---|---|---|
| | Positive electrode Active material | Active material | Average particle size of active material particle (nm) | Presence or absence of phase of carbon material | Amount of carbon in phase of carbon material (wt %) | Binder |
| Example 8 | $LiMn_2O_4$ | $Li_4Ti_5O_{12}$ | 800 | Present | 2 | Acrylic resin B |
| Example 9 | $LiMn_2O_4$ | $Li_4Ti_5O_{12}$ | 800 | Present | 2 | Acrylic resin B |
| Example 10 | $LiMn_2O_4$ | $Li_4Ti_5O_{12}$ | 800 | Present | 2 | Acrylic resin B |
| Example 11 | $LiMn_2O_4$ | $Li_4Ti_5O_{1.2}$ | 800 | Present | 2 | Acrylic resin B |

In addition, Table 8 below shows conditions for manufacturing the negative electrodes in Examples 8 to 11. Specifically, a coating speed at the time of applying the negative electrode slurry to the current collector, a drying temperature at the time of drying a coating film of the negative electrode slurry, and a press temperature at the time of pressing the negative electrode mixed-materials layer are summarized in Table 8.

TABLE 8

| | Negative electrode manufacturing conditions | | |
|---|---|---|---|
| | Speed of applying negative electrode slurry (m/min) | Drying temperature of negative electrode slurry (° C.) | Pressing temperature of negative electrode mixed-materials layer (° C.) |
| Example 8 | 2.0 | 130 | 25 |
| Example 9 | 0.5 | 130 | 25 |
| Example 10 | 2.0 | 80 | 25 |
| Example 11 | 2.0 | 130 | 80 |

Further, with respect to the negative electrodes manufactured in Examples 8 to 11, the peak intensity ratio $I_G/I_D$, the peel strength α, and the cutting strength β were calculated in the same manner as in Examples 1 to 7. The obtained peak intensity ratio $I_G/I_D$, the peel strength α, the cutting strength β, and the ratio α/β are summarized in Table 9 below.

TABLE 9

| | Peak intensity ratio $I_G/I_D$ between G band and D band of carbon material | Peel strength α between negative electrode current collector and negative electrode mixed-materials layer (kN/m) | Cutting strength β within negative electrode mixed-materials layer (kN/m) | α/β |
|---|---|---|---|---|
| Example 8 | 0.90 | 1.25 | 0.19 | 6.58 |
| Example 9 | 0.89 | 1.32 | 0.20 | 6.60 |
| Example 10 | 0.89 | 1.38 | 0.19 | 7.26 |
| Example 11 | 0.88 | 1.33 | 0.22 | 6.05 |

It was confirmed from measurement results of Examples 8 to 10 shown in Tables 8 and 9 that when the coating speed of the slurry was lowered or the temperature at which the coating film of the slurry was dried was lowered, there was a trend where the peel strength (α) between the current collector and the mixed-materials layer was improved in the electrode. Further, it was confirmed from the measurement results of Example 8 and Example 11 that there was a trend where the cutting strength (β) improved by increasing the press temperature at the time of manufacturing the electrode.

(Evaluation of performance)

With respect to the nonaqueous electrolyte batteries manufactured in Examples 8 to 11, a charge-and-discharge cycle test of 500 cycles at 60° C. was respectively performed in the same manner as in the nonaqueous electrolyte batteries of Examples 1 to 7 and Comparative Examples 1 to 8. Obtained capacity retention ratios after 500 cycles at 60° C. are summarized in Table 10 below.

TABLE 10

|  | Capacity retention ratio after 500 cycles at 60° C. (%) |
|---|---|
| Example 8 | 94.8 |
| Example 9 | 95.0 |
| Example 10 | 95.3 |
| Example 11 | 94.7 |

As shown in Table 9, the ratio α/β of the peel strength α between the negative electrode current collector and the negative electrode mixed-materials layer, and the cutting strength β of the negative electrode mixed-materials layer was larger than 6 in the negative electrodes manufactured in Examples 8 to 11. As shown in Table 10, the capacity retention ratio after 500 cycles at 60° C. was good in the nonaqueous electrolyte batteries manufactured using these negative electrodes.

According to at least one embodiment and Examples as described above, a nonaqueous electrolyte battery is provided. The nonaqueous electrolyte battery includes a positive electrode, a negative electrode including a negative electrode current collector, and a negative electrode mixed-materials layer disposed on the negative electrode current collector, and a nonaqueous electrolyte. The negative electrode mixed-materials layer includes titanium-including metal oxide particles capable of having lithium ions inserted into and extracted from; and a binder that includes an acrylic resin. The titanium-including metal oxide particle includes a phase including a carbon material on at least a portion of a surface thereof. A peel strength α between the negative electrode current collector and the negative electrode mixed-materials layer according to a surface/interface cutting method, and a cutting strength β in the negative electrode mixed-materials layer according to the surface/interface cutting method satisfy a relationship of α/β>6.

According to such a configuration, it is possible to provide a nonaqueous electrolyte battery and a battery pack having excellent high temperature durability, and a vehicle including the battery pack.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A nonaqueous electrolyte battery comprising:
a positive electrode;
a negative electrode comprising a negative electrode current collector, and a negative electrode mixed-materials layer disposed on the negative electrode current collector, the negative electrode mixed-materials layer having a thickness of 10 μm to 75 μm and comprising a titanium-comprising metal oxide particle capable of having lithium ions inserted into and extracted from, and a binder that comprises an acrylic resin, the titanium-comprising metal oxide particle comprising a phase that comprises a carbon material on at least a portion of a surface thereof, and the negative electrode satisfying Equation (I); and
a nonaqueous electrolyte:

$$\alpha/\beta > 6 \quad (I)$$

wherein, in Equation (I), α is a peel strength (kN/m) between the negative electrode current collector and the negative electrode mixed-materials layer according to a surface/interface cutting method, and β is a cutting strength (kN/m) in the negative electrode mixed-materials layer according to the surface/interface cutting method.

2. The nonaqueous electrolyte battery according to claim 1, wherein the peel strength α is from 1.1 kN/m to 20 kN/m.

3. The nonaqueous electrolyte battery according to claim 1, wherein the titanium-comprising metal oxide particle is a particle comprising at least one selected from the group consisting of spinel type lithium titanate, monoclinic titanium dioxide, monoclinic titanium composite oxide, niobium-titanium composite oxide represented by a formula $Ti_{1-x}M_{x+y}Nb_{2-y}O_{7-\delta}$, wherein $0 \leq x < 1$, $0 \leq y < 1$, M is at least one selected from the group consisting of Mg, Fe, Ni, Co, W, Ta, and Mo, and orthorhombic Na-comprising niobium-titanium composite oxide represented by a formula $Li_{2+v}Na_{2-w}M1_xTi_{6-y-z}Nb_yM2_zO_{14+\delta}$, wherein $0 \leq v \leq 4$, $0 < w < 2$, $0 \leq x < 2$, $0 < y < 6$, $0 \leq z < 3$, $y+z < 6$, $-0.5 \leq \delta \leq 0.5$, M1 is at least one selected from the group consisting of Cs, K, Sr, Ba, and Ca, and M2 is at least one selected from the group consisting of Zr, Sn, V, Ta, Mo, W, Fe, Co, Mn, and Al.

4. The nonaqueous electrolyte battery according to claim 1, wherein the acrylic resin is an acrylic resin comprising a nitrile group, or a copolymer of the acrylic resin comprising the nitrile group.

5. The nonaqueous electrolyte battery according to claim 1, wherein the acrylic resin is an acrylic resin that comprises a methacrylate copolymer comprising a phosphate group.

6. The nonaqueous electrolyte battery according to claim 1, wherein the binder comprises a mixture of the acrylic resin and a methacrylate-based resin, and a mixing ratio of the acrylic resin is from 50 wt % to 90 wt %.

7. The nonaqueous electrolyte battery according to claim 1, wherein the binder has a weight average molecular weight of 10,000 to 50,000,000.

8. The nonaqueous electrolyte battery according to claim 1, wherein the carbon material satisfies a ratio $I_G/I_D$ of a peak intensity $I_G$ of a G band to a peak intensity $I_D$ of a D band of from 0.8 to 1.2, the G band being observed at 1530 $cm^{-1}$ to 1630 $cm^{-1}$ in a Raman chart obtained by Raman spectroscopy measurement using a measurement light source of 532 nm of the carbon material, and the D band being observed at 1280 $cm^{-1}$ to 1380 $cm^{-1}$ in the Raman chart.

9. A battery pack comprising the nonaqueous electrolyte battery according to claim 1.

10. The battery pack according to claim 9 further comprising:
an external power distribution terminal; and
a protective circuit.

11. The battery pack according to claim 9, comprising a plurality of the nonaqueous electrolyte batteries, the nonaqueous electrolyte batteries being electrically connected in series, in parallel, or in a combination of series and parallel.

12. A vehicle comprising the battery pack according to claim 9.

13. The vehicle according to claim 12, wherein the battery pack is configured to recover a regenerative energy of a power of the vehicle.

14. An electrode comprising:
a current collector; and
a mixed-materials layer disposed on the current collector, the mixed-materials layer having a thickness of 10 μm to 75 μm and comprising a titanium-comprising metal oxide particle capable of having lithium ions inserted into and extracted from, and a binder that comprises an acrylic resin, the titanium-comprising metal oxide particle comprising a phase that comprises a carbon material on at least a portion of a surface thereof,
the electrode satisfying Equation (I):

$$\alpha/\beta > 6 \quad (I)$$

wherein, in Equation (I), $\alpha$ is a peel strength (kN/m) between the current collector and the mixed-materials layer according to a surface/interface cutting method, and $\beta$ is a cutting strength (kN/m) in the mixed-materials layer according to the surface/interface cutting method.

15. The electrode according to claim 14, wherein the peel strength $\alpha$ is from 1.1 kN/m to 20 kN/m.

16. The electrode according to claim 14, wherein the titanium-comprising metal oxide particle is a particle comprising at least one selected from the group consisting of spinet type lithium titanate, monoclinic titanium dioxide, monoclinic titanium composite oxide, niobium-titanium composite oxide represented by a formula $Ti_{1-x}M_{x+y}Nb_{2-y}O_{7-\delta}$, wherein $0 \leq x < 1$, $0 \leq y < 1$, M is at least one selected from the group consisting of Mg, Fe, Ni, Co. W, Ta, and Mo, and orthorhombic Na-comprising niobium-titanium composite oxide represented by a formula $Li_{2+v}Na_{2-w}M1_x Ti_{6-y-z}Nb_y M2_z O_{14+\delta}$, wherein $0 \leq v \leq 4$, $0 < w < 2$, $0 \leq x < 2$, $0 < y < 6$, $0 \leq z < 3$, $y+z < 6$, $-0.5 \leq \delta \leq 0.5$, M1 is at least one selected from the group consisting of Cs, K, Sr, Ba, and Ca, and M2 is at least one selected from the group consisting of Zr, Sn, V, Ta, Mo, W, Fe. Co, Mn, and Al.

17. The electrode according to claim 14, wherein the acrylic resin is an acrylic resin comprising a nitrile group, or a copolymer of the acrylic resin comprising the nitrile group.

18. The electrode according to claim 14, wherein the cutting strength $\beta$ is 0.18 kN/m to 3.33 kN/m.

19. The electrode according to claim 14, wherein the peel strength $\alpha$ and the cutting strength $\beta$ satisfy $\alpha/\beta < 7$.

* * * * *